United States Patent
Zilio

(10) Patent No.: US 11,228,256 B2
(45) Date of Patent: Jan. 18, 2022

(54) MULTILEVEL POWER CONVERTER AND CONTROL METHOD

(71) Applicant: Infineon Technologies AG, Neubiberg (DE)

(72) Inventor: Nicolo Zilio, Villach (AT)

(73) Assignee: Infineon Technologies AG, Neubiberg (DE)

(*) Notice: Subject to any disclaimer, the term of this patent is extended or adjusted under 35 U.S.C. 154(b) by 0 days.

(21) Appl. No.: 16/688,117

(22) Filed: Nov. 19, 2019

(65) Prior Publication Data

US 2021/0152100 A1 May 20, 2021

(51) Int. Cl.
*H02M 7/483* (2007.01)
*H02M 1/00* (2006.01)
*H02M 3/158* (2006.01)
*H02M 3/335* (2006.01)

(52) U.S. Cl.
CPC ......... *H02M 7/483* (2013.01); *H02M 1/0095* (2021.05); *H02M 3/158* (2013.01); *H02M 1/0003* (2021.05); *H02M 1/0032* (2021.05); *H02M 3/33507* (2013.01)

(58) Field of Classification Search
CPC ............... H02M 1/0095; H02M 7/483; H02M 1/0032
See application file for complete search history.

(56) References Cited

U.S. PATENT DOCUMENTS

| 10,038,365 | B2* | 7/2018 | Zhak | H02M 1/36 |
| 2009/0267580 | A1* | 10/2009 | Derksen | H02M 3/158 |
| | | | | 323/282 |
| 2010/0131219 | A1* | 5/2010 | Kenly | H02M 3/157 |
| | | | | 702/64 |
| 2016/0261190 | A1* | 9/2016 | Shenoy | H02M 1/14 |
| 2018/0205307 | A1* | 7/2018 | Vukadinovic | H02M 3/158 |

OTHER PUBLICATIONS

Eslam Abdelhamid et al. "Stability Properties of the 3-Level Flying Capacitor Buck Converter Under Peak or Valley Current-Programmed-Control" IEEE Transactions on Power Electronics, 2018, pp. 1-14.
Eslam Abdelhamid et al. "Sensorless and Low Complexity Stabilizing Approach for Peak Current-Programmed-Control Three-Level Flying-Capacitor Converter" IEEE Transactions on Power Electronics, 2019, pp. 1-14.
Samuel Da Silva Carvalho et al. "Digital PWM for Multi-Level Flying Capacitor Converters with Improved Output Resolution and Flying Capacitor Voltage Controller Stability" 2018 IEEE 19th Workshop on Control and Modeling for Power Electronics (COMPEL), pp. 1-7.
Liangji Lu et al. "Peak Offsetting Based CPM Controller for Multi-level Flying Capacitor Converters" 2018 Applied Power Electronics Conference and Exposition (APEC), pp. 3102-3107.

(Continued)

*Primary Examiner* — Alex Torres-Rivera
(74) *Attorney, Agent, or Firm* — Slater Matsil, LLP

(57) ABSTRACT

A controller includes a voltage sensing circuit configured to detect a voltage variation across a capacitor of a power converter, and a control circuit configured to calculate a current flowing through an inductor of the power converter based on the voltage variation across the capacitor of the power converter.

20 Claims, 26 Drawing Sheets

(56) References Cited

OTHER PUBLICATIONS

Liangji Lu et al. "Digital Average Current Programmed Mode Control for Multi-level Flying Capacitor Converters" 2018 IEEE 19th Workshop on Control and Modeling for Power Electronics (COMPEL), pp. 1-7.
Jan S. Rentmeister et al. "A Flying Capacitor Multilevel Converter with Sampled Valley-Current Detection for Multi-Mode Operation and Capacitor Voltage Balancing" 2016 IEEE Energy Conversion Congress and Exposition (ECCE), pp. 1-8.
Andrew Stillwell et al. "Constant Effective Duty Cycle Control for Flying Capacitor Balancing in Flying Capacitor Multi-Level Converters" 2018 IEEE 19th Workshop on Control and Modeling for Power Electronics (COMPEL), pp. 1-8.
Nenad Vukadinovic et al. "Skip-Duty Control Method for Minimizing Switching Stress in Low-Power Multi-Level Dc-Dc Converters" 2015 IEEE 16th Workshop on Control and Modeling for Power Electronics (COMPEL), pp. 1-7.

* cited by examiner

MULTILEVEL POWER CONVERTER AND CONTROL METHOD

TECHNICAL FIELD

The present invention relates generally to a multilevel power converter and control method.

BACKGROUND

As technologies further advance, a variety of electronic devices, such as mobile phones, tablet PCs, digital cameras, MP3 players and/or the like, have become popular. Each electronic device requires direct current power at a substantially constant voltage which may be regulated within a specified range even when the current drawn by the electronic device may vary over a wide range. When an input voltage is lower than the specific range, a step-up dc/dc converter may be employed to convert the input voltage into a regulated voltage within the specific range. On the other hand, when the input voltage is higher than the specific range, a step-down dc/dc converter may be used to convert the voltage of the input power source into a lower voltage to satisfy the operational voltage to which the electronic circuit is specified.

There may be a variety of dc/dc conversion topologies. In accordance with the topology difference, dc/dc converters can be divided into three categories, namely, switching dc/dc converters, linear regulators and switched-capacitor converters. In accordance with the number and configuration of the switches, power converters can be divided into multiple categories, such as the traditional buck/boost converters or more generically to N-Level power converters.

As integrated circuits become increasingly advanced while shrinking in size at the same time, a compact and high efficiency dc/dc conversion topology is desirable. In comparison with other topologies, switched-capacitor converters are less complicated because the switched-capacitor converters are formed by a plurality of switches and flying capacitors. In addition, the switched-capacitor converters have a small footprint and are capable of generating a high efficient power conversion by switching the flying capacitor between a charging phase and a discharging phase. As a result, the switched-capacitor converters can provide compact and efficient power for integrated circuits.

Furthermore, a switched-capacitor converter with a constant current load leads to increased efficiency in comparison to a traditional switched-capacitor converter. This current load can be implemented as an inductor connected to the output of the switched-capacitor converter. A three-level power converter having a constant current load includes four switches connected in series, a flying capacitor as an energy buffer and a current load formed by an inductor.

The three-level power converter may be extended to a generic N-level power converter by adding more switches and more flying capacitors. For example, a four-level power converter comprises a first switch, a second switch, a third switch, a fourth switch, a fifth switch and a sixth switch connected in series between two input terminals of the four-level power converter. The four-level power converter further comprises a first flying capacitor connected between a common node of the third switch and the fourth switch, and a common node of the fourth switch and the fifth switch, a second flying capacitor connected between a common node of the first switch and the second switch, and a common node of the fifth switch and the sixth switch, and an inductor connected between a common node of the third switch and the fourth switch and an output terminal of the four-level power converter.

SUMMARY

In accordance with an embodiment, a controller comprises a voltage sensing circuit configured to detect a voltage variation across a capacitor of a power converter, and a control circuit configured to calculate a current flowing through an inductor of the power converter based on the voltage variation across the capacitor of the power converter.

In accordance with another embodiment, a method comprises during a switching cycle of a multilevel power converter, detecting a voltage variation across a flying capacitor of the multilevel power converter, calculating a current flowing through an inductor of the multilevel power converter based on the voltage variation across the flying capacitor, and calculating, by a controller, a duty cycle of the multilevel power converter using the current flowing through the inductor as an average current control variable of a current control loop.

In accordance with yet another embodiment, a method comprises during a switching cycle of a multilevel power converter, detecting a first voltage across a flying capacitor of the multilevel power converter at a first time instant, detecting a second voltage across the flying capacitor at a second time instant, calculating, by a controller, a current flowing through an inductor of the multilevel power converter based on a voltage difference between the second voltage and the first voltage, and applying a current control loop to the multilevel power converter, wherein the current calculated by the controller functions as a current control variable for the current control loop.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

The multilevel converter shown in FIGS. 1-26 are based on a three-level power converter. It should be noted that the three-level power converter is merely an example. One of ordinary skill in the art will realize that the control mechanism described in FIGS. 1-26 may be applicable to a converter having more levels such as a four-level power converter. Likewise, FIGS. 23 and 24 show a digital implementation of the feedback control loop. This digital implementation is merely an example, which should not unduly limit the scope of the claims. One of ordinary skill in the art would recognize many variations, alternatives, and modifications. For example, the digital circuit shown in FIGS. 23 and 24 may be replaced by suitable analog circuits, a combination of digital circuits and analog circuit and the like.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely a method for estimating an average current flowing through an inductor of a multilevel power converter. The invention may also be applied, however, to a variety of power converters. Hereinafter, various embodiments will be explained in detail with reference to the accompanying drawings.

Current mode based control mechanisms are employed to address various challenges for controlling the multilevel power converter. Current mode controllers require current sensors. The circuit complexity of the current sensors raises the costs of the current mode controllers. It would be desirable to have a simple and reliable control method to replace the current sensors, thereby improving the performance of multilevel converters.

An advantage of an embodiment of the present disclosure is a simple and reliable method for estimating an average current flowing through an inductor of a multilevel power converter having a flying capacitor.

Figure 1:
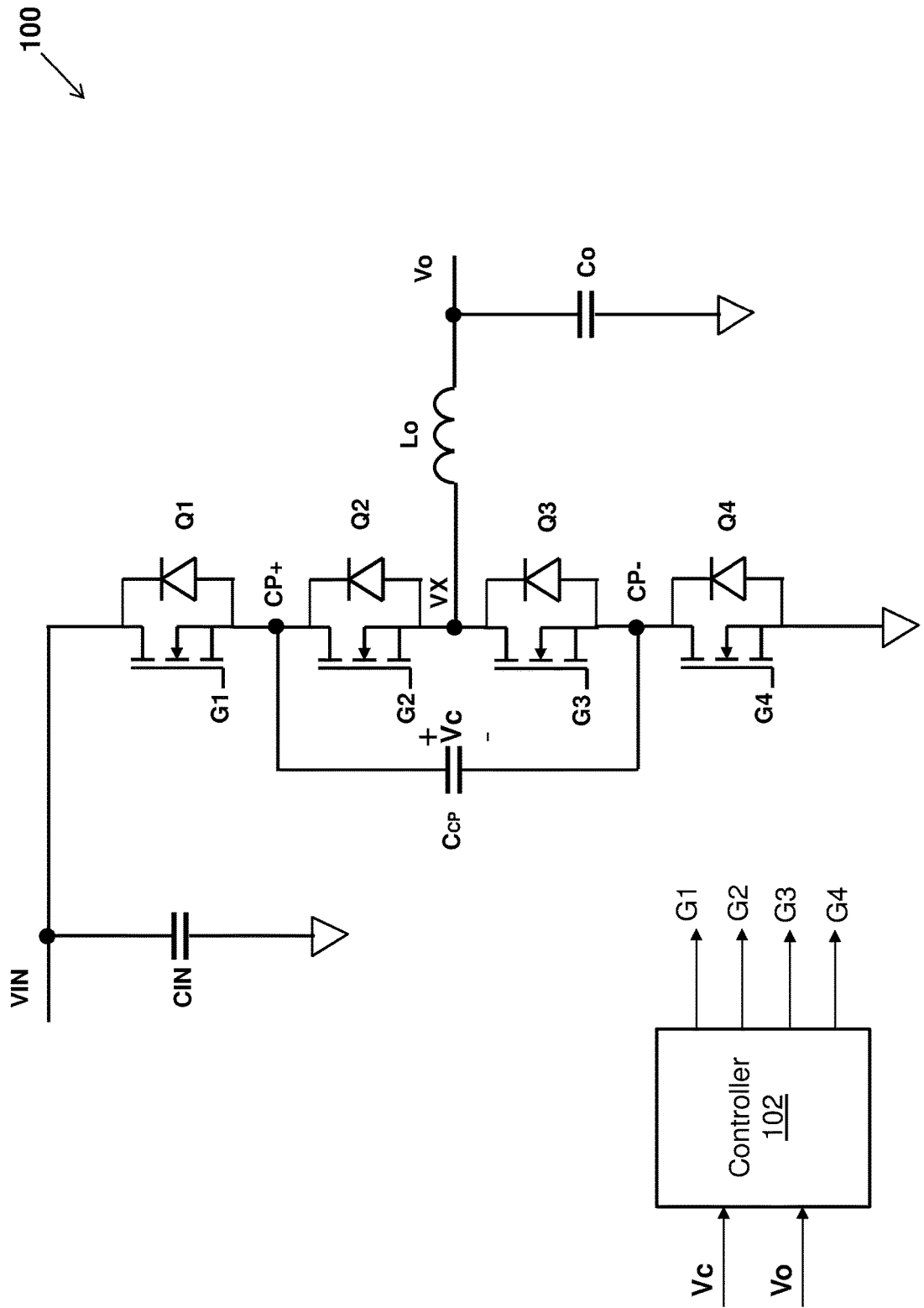
FIG. 1 illustrates a schematic diagram of a multilevel converter in accordance with various embodiments of the present disclosure.

FIG. 1 illustrates a schematic diagram of a multilevel converter in accordance with various embodiments of the present disclosure. The multilevel converter 100 comprises an input capacitor CIN, a first switch Q1, a second switch Q2, a third switch Q3, a fourth switch Q4, a capacitor $C_{CP}$, an output inductor Lo and an output capacitor Co. The input capacitor CIN is connected between an input voltage bus VIN and ground. In some embodiments, the input voltage bus VIN is connected to a power source. Throughout the description, the input voltage bus VIN may be alternatively referred to as the input voltage VIN. The output capacitor Co is connected between an output voltage bus Vo and ground. In some embodiments, the output voltage bus Vo is connected to a load, a downstream power converter and the like. Throughout the description, the output voltage bus Vo may be alternatively referred to as the output voltage Vo.

As shown in FIG. 1, the first switch Q1, the second switch Q2, the third switch Q3 and the fourth switch Q4 are connected in series between the input voltage bus VIN and ground. A common node of the first switch Q1 and the second switch Q2 is denoted as CP+ as shown in FIG. 1. Likewise, a common node of the third switch Q3 and the fourth switch Q4 is denoted as CP−. A common node of the second switch Q2 and the third switch Q3 is denoted as VX. As shown in FIG. 1, the capacitor $C_{CP}$ is connected between CP+ and CP−. The inductor Lo is connected between VX and the output voltage bus Vo.

The multilevel converter 100 is a step-down power converter. The multilevel converter 100 functions as a charge pump power converter. In some embodiments, the capacitor $C_{CP}$ functions as a charge pump capacitor. The charge pump capacitor is often referred to as a flying capacitor. Throughout the description, the capacitor $C_{CP}$ is alternatively referred to as a flying capacitor. In a steady state operation mode, the average voltage across the flying capacitor $C_{CP}$ is equal to one half of the input voltage VIN. It should be noted that, for an N-level converter, the average voltage across each flying capacitor is equal to VIN divided by (N−1).

In accordance with an embodiment, the switches (e.g., switches Q1-Q4) shown in FIG. 1 may be metal oxide semiconductor field-effect transistor (MOSFET) devices. Alternatively, the switching element can be any controllable switches such as insulated gate bipolar transistor (IGBT) devices, integrated gate commutated thyristor (IGCT) devices, gate turn-off thyristor (GTO) devices, silicon controlled rectifier (SCR) devices, junction gate field-effect transistor (JFET) devices, MOS controlled thyristor (MCT) devices, gallium nitride (GaN) based power devices, silicon carbide (SiC) based power devices and the like.

It should be noted while FIG. 1 shows the switches Q1-Q4 are implemented as single n-type transistors, a person skilled in the art would recognize there may be many variations, modifications and alternatives. For example, depending on different applications and design needs, the switches Q1-Q4 may be implemented as p-type transistors. Furthermore, each switch shown in FIG. 1 may be implemented as a plurality of switches connected in parallel. Moreover, a capacitor may be connected in parallel with one switch to achieve zero voltage switching (ZVS)/zero current switching (ZCS).

In some embodiments, the gate drive signal (G4) applied to the fourth Q4 is complementary to the gate drive signal (G1) applied to the first switch Q1. The gate drive signal (G3) applied to the third switch Q3 is complementary to the gate drive signal (G2) applied to the second switch Q2. The duty cycle of the gate drive signal applied to the first switch Q1 is equal to the duty cycle of the gate drive signal applied to the second switch Q2. There is a phase shift between the gate drive signal applied to the first switch Q1 and the gate drive signal applied to the second switch Q2. In some embodiments, the phase shift is equal to 180 degrees for a three-level converter. In other words, the delay between the leading edge of the gate drive signal applied to the first switch Q1 and the leading edge of the gate drive signal applied to the second switch Q2 is equal to one half of the switching cycle of the multilevel converter 100.

The multilevel converter 100 may operate in two different operating modes, namely a low duty cycle mode and a high duty cycle mode. In some embodiments, when the duty cycle of the gate drive signal applied to the first switch Q1 is less than or equal to 50%, the multilevel converter 100 operates in the low duty cycle mode. When the duty cycle of the gate drive signal applied to the first switch Q1 is greater than 50%, the multilevel converter 100 operates in the high duty cycle mode.

In the low duty cycle mode, the multilevel converter 100 (three-level converter as shown in FIG. 1) operates in four different phases. In each phase, the current flowing through the output inductor Lo may ramp up or down depending on different combinations of the input voltage VIN, the voltage across the flying capacitor $C_{CP}$ and the output voltage Vo. In the low duty cycle mode, the output voltage of the multilevel converter 100 can be regulated to a predetermined voltage. The detailed operating principles of the low duty cycle mode will be described below with respect to FIGS. 2-6.

In the high duty cycle mode, the multilevel converter 100 operates in four different phases. In each phase, the current flowing through the output inductor Lo may ramp up or down depending on different combinations of the input voltage VIN, the voltage across the flying capacitor $C_{CP}$ and the output voltage Vo. In the high duty cycle mode, the output voltage of the multilevel converter 100 can be regulated to a predetermined voltage. The detailed operating principles of the high duty cycle mode will be described below with respect to FIGS. 7-11.

FIG. 1 further illustrates a controller 102. The controller 102 may be implemented as any suitable controllers such as a microprocessor, a digital signal processor (DSP) and the like. The controller 102 detects various operating parameters (e.g., the input voltage VIN, the output voltage Vo, the voltage across the flying capacitor, the load current, any combinations thereof and the like). Based upon the detected operating parameters, the controller 102 determines the gate drive signals (G1-G4) of switches Q1-Q4 as shown in FIG. 1.

In some embodiments, the controller 102 is configured to detect the output voltage Vo. More particularly, the controller 102 is configured to detect the output voltage Vo through a suitable voltage sensing circuit such as a voltage divider and the like. The controller 102 is also configured to detect the voltage across the flying capacitor $C_{CP}$. More particularly, the controller 102 may detect the voltage across the flying capacitor $C_{CP}$ through a voltage sensing circuit comprising two voltage sensors. A first voltage sensor is connected to the positive terminal of the flying capacitor $C_{CP}$. A second voltage sensor is connected to the negative terminal of the flying capacitor $C_{CP}$. An analog-to-digital converter (ADC) may be employed to convert sensed voltages into corresponding digital signals. The controller 102 calculates the voltage across the flying capacitor $C_{CP}$ based on the difference between the voltages sensed by these two voltage sensors.

In operation, the controller 102 determines the gate drive signals of switches Q1, Q2, Q3 and Q4 based on an average current mode control mechanism. In some embodiments, two control loops are employed when the average current mode control mechanism is applied to the multilevel converter 100. An outer control loop is a voltage control loop in which the detected output voltage is compared with a predetermined voltage reference to set a current reference. An inner control loop is a current control loop in which the voltage variation across the flying capacitor $C_{CP}$ is used to estimate the average current flowing through the inductor of the multilevel converter 100. The average current is then compared with the current reference generated by the outer control loop to determine a duty cycle of the gate drive signal applied to the first switch Q1.

The duty cycle of the second switch Q2 is the same as that of the first switch Q1. There is a delay between the leading edge of the gate drive signal of the second switch Q2 and the leading edge of the gate drive signal of the first switch Q1. The delay is equal to one half of the switching cycle. The gate drive signal of the fourth switch Q4 is complementary to the gate drive signal of the first switch Q1. The gate drive signal of the fourth switch Q3 is complementary to the gate drive signal of the first switch Q2. It should be noted that the gate drive timing scheme in this paragraph is employed for controlling a three-level converter. Furthermore, depending on different applications and design needs, the duty cycle of the second switch Q2 can be different from that of the first switch Q1. In order to generate two different duty cycles for Q1 and Q2 respectively, suitable control schemes may be employed. For example, a multi-sampling controller may be employed to calculate the duty cycle of the second switch Q2.

Depending on different operating conditions, the multilevel converter 100 may operate either in the low duty cycle mode or the high duty cycle mode. In the low duty cycle mode, the multilevel converter 100 operates in four different phases.

Figure 2:
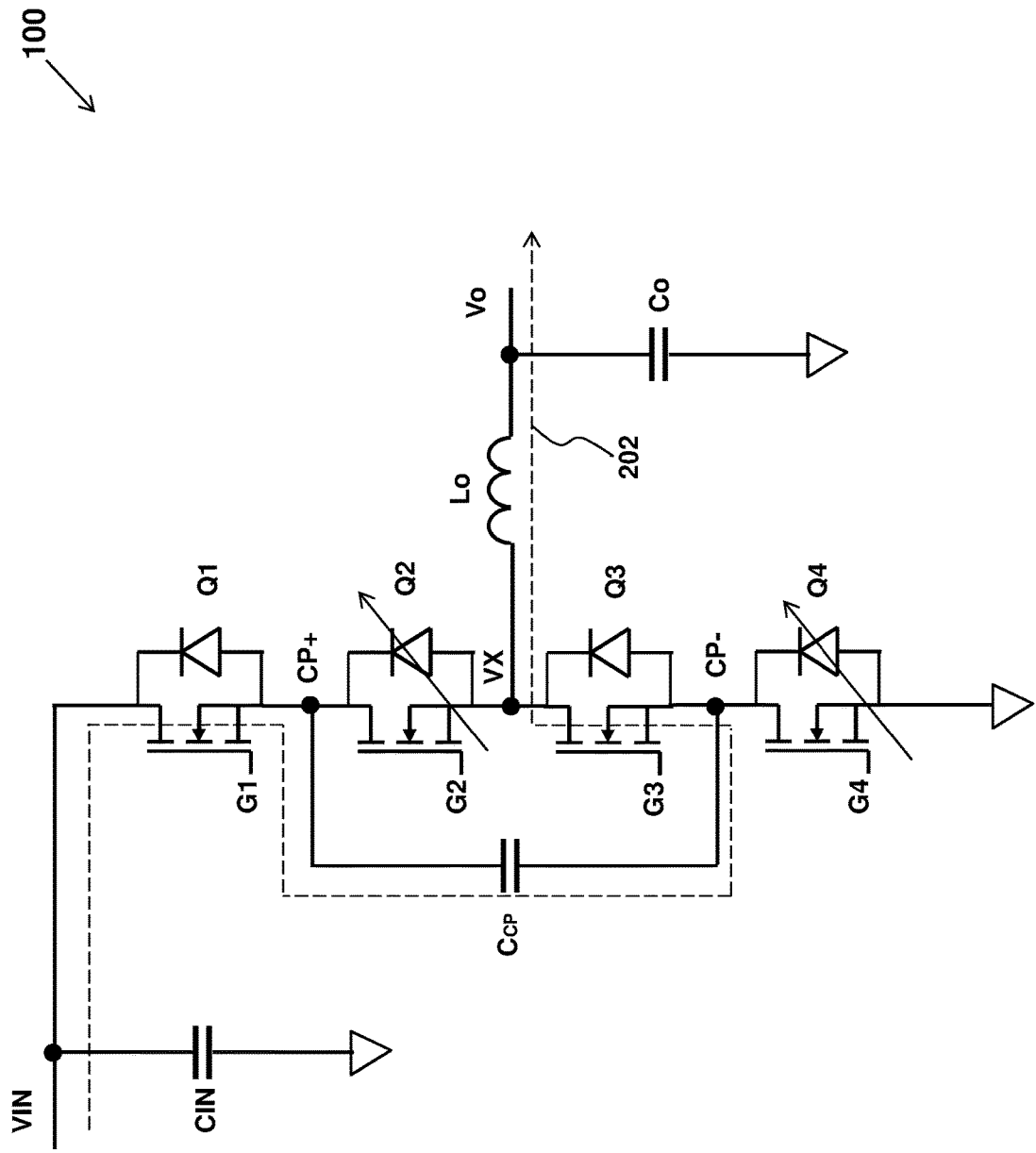
FIG. 2 illustrates the operating principle of the first phase of the low duty cycle mode of the multilevel converter shown in FIG. 1 in accordance with various embodiments of the present disclosure.

FIG. 2 illustrates the operating principle of the first phase of the low duty cycle mode of the multilevel converter shown in FIG. 1 in accordance with various embodiments of the present disclosure. During the first phase of the low duty cycle mode, the second switch Q2 is turned off as indicated by the arrow placed on top of the symbol of the second switch Q2. Likewise, the fourth switch Q4 is turned off as indicated by the arrow placed on top of the symbol of the fourth switch Q4. Since switches Q1 and Q3 are turned on as shown in FIG. 2, a conductive path is established as indicated by the dashed line 202. The conductive path is formed by the first switch Q1, the flying capacitor $C_{CP}$, the third switch Q3 and output inductor Lo. The current flows from the input voltage bus VIN to the output voltage bus Vo through the conductive path shown in FIG. 2.

During the first phase of the low duty cycle mode, the flying capacitor $C_{CP}$ is charged, and energy is stored in the flying capacitor $C_{CP}$ accordingly. The current flowing through the inductor Lo may ramp up or down depending on the voltage applied across the inductor Lo. In some embodiments, when the input voltage VIN is greater than the sum of the voltage across the flying capacitor $C_{CP}$ and the output voltage Vo, the current flowing through the inductor Lo ramps up, and the energy stored in the inductor Lo increases accordingly. The current slope S of the inductor Lo satisfies the following equation:

$$S=(Vin-Vc-Vo)/Lo \quad (1)$$

where $V_C$ is the voltage across the flying capacitor $C_{CP}$.

During the first phase of the low duty cycle mode, the voltage variation across the flying capacitor $C_{CP}$ satisfies the following equation:

$$\Delta Vc=(Io\times D)/(fs\times Ccp) \quad (2)$$

where D is the duty cycle of the multilevel converter 100, and fs is the switching frequency of the multilevel converter 100. Io is the average current flowing through the inductor Lo. It should be noted that D is equal to the turn-on time of the first switch Q1 divided by the switching cycle of the multilevel converter 100.

Figure 3:
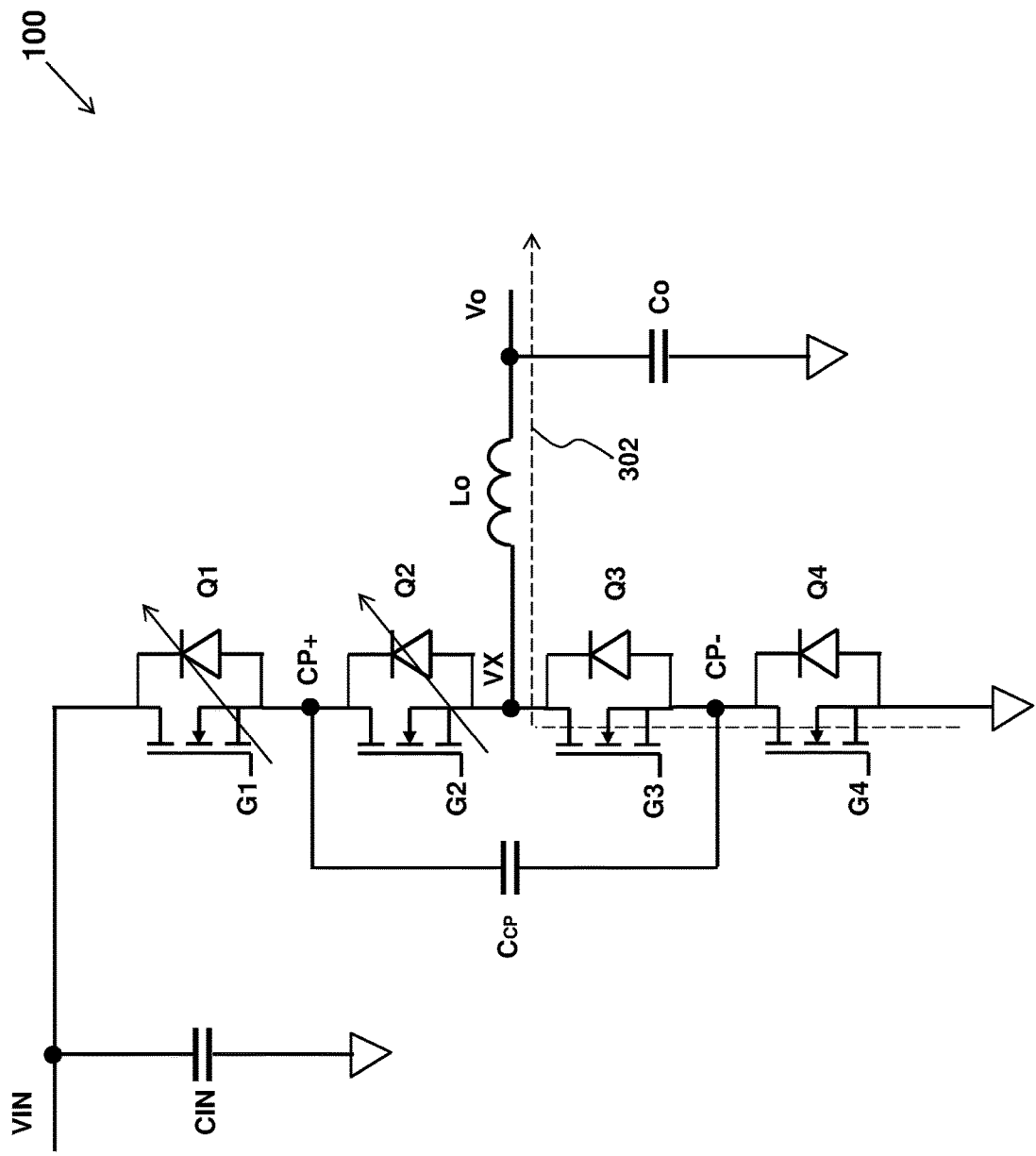
FIG. 3 illustrates the operating principle of the second phase of the low duty cycle mode of the multilevel converter shown in FIG. 1 in accordance with various embodiments of the present disclosure.

FIG. 3 illustrates the operating principle of the second phase of the low duty cycle mode of the multilevel converter shown in FIG. 1 in accordance with various embodiments of the present disclosure. During the second phase of the low duty cycle mode, the first switch Q1 and the third switch Q2 are turned off as indicated by the arrows placed on their symbols, respectively. Since switches Q3 and Q4 are turned on, a conductive path is established as indicated by the dashed line 302 shown in FIG. 3. The conductive path is formed by the fourth switch Q4, the third switch Q3 and output inductor Lo. In some embodiments, the fourth switch Q4 provides a freewheeling path for the current flowing through the output inductor Lo.

During the second phase of the low duty cycle mode, the flying capacitor $C_{CP}$ is isolated by the turned-off switches Q1 and Q2. Since the flying capacitor $C_{CP}$ is isolated, the voltage across the flying capacitor $C_{CP}$ is kept constant during the second phase of the low duty cycle mode. The current flowing through the inductor Lo ramps down and the energy stored in the inductor Lo decreases accordingly. During the second phase of the low duty cycle mode, the current slope S of the inductor Lo satisfies the following equation:

$$S=-Vo/Lo \quad (3)$$

Figure 4:
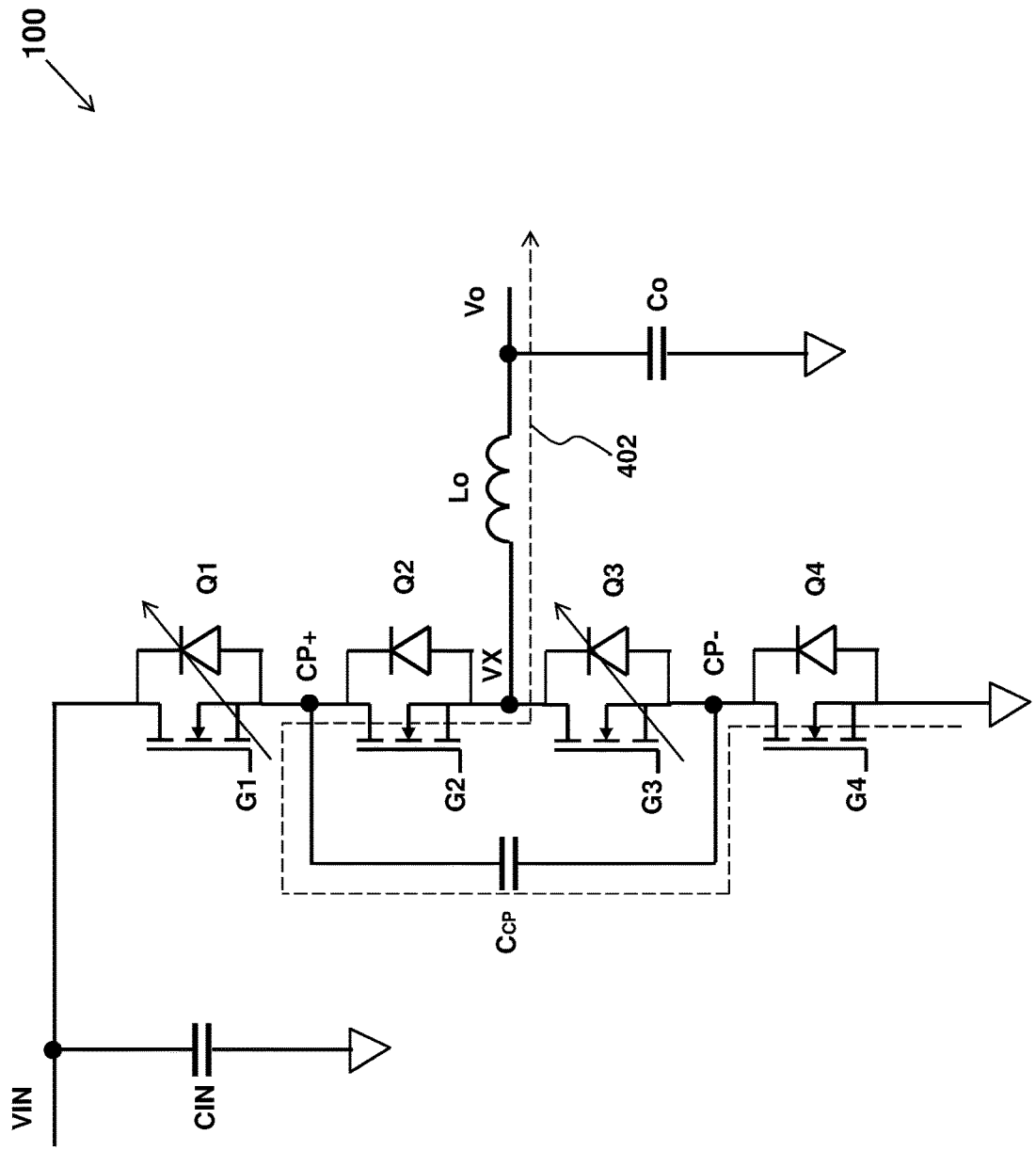
FIG. 4 illustrates the operating principle of the third phase of the low duty cycle mode of the multilevel converter shown in FIG. 1 in accordance with various embodiments of the present disclosure.

FIG. 4 illustrates the operating principle of the third phase of the low duty cycle mode of the multilevel converter shown in FIG. 1 in accordance with various embodiments of the present disclosure. During the third phase of the low duty cycle mode, the first switch Q1 and the third switch Q3 are turned off as indicated by the arrows placed on their symbols, respectively. Since switches Q2 and Q4 are turned on, a conductive path is established as indicated by the dashed line 402 shown in FIG. 4. The conductive path is formed by the fourth switch Q4, the flying capacitor $C_{CP}$, the second switch Q2 and output inductor Lo.

During the third phase of the low duty cycle mode, the current discharges the flying capacitor $C_{CP}$ and the energy stored in the flying capacitor $C_{CP}$ decreases accordingly. In some embodiments, the current flowing through the inductor Lo may ramp up and the energy stored in the inductor Lo increases accordingly. In the third phase of the low duty cycle mode, the current slope S of the inductor Lo satisfies the following equation:

$$S=(Vc-Vo)/Lo \quad (4)$$

During the third phase of the low duty cycle mode, the voltage variation across the flying capacitor $C_{CP}$ is the same as that during the first phase of the low duty cycle mode, and hence is not illustrated herein.

Figure 5:
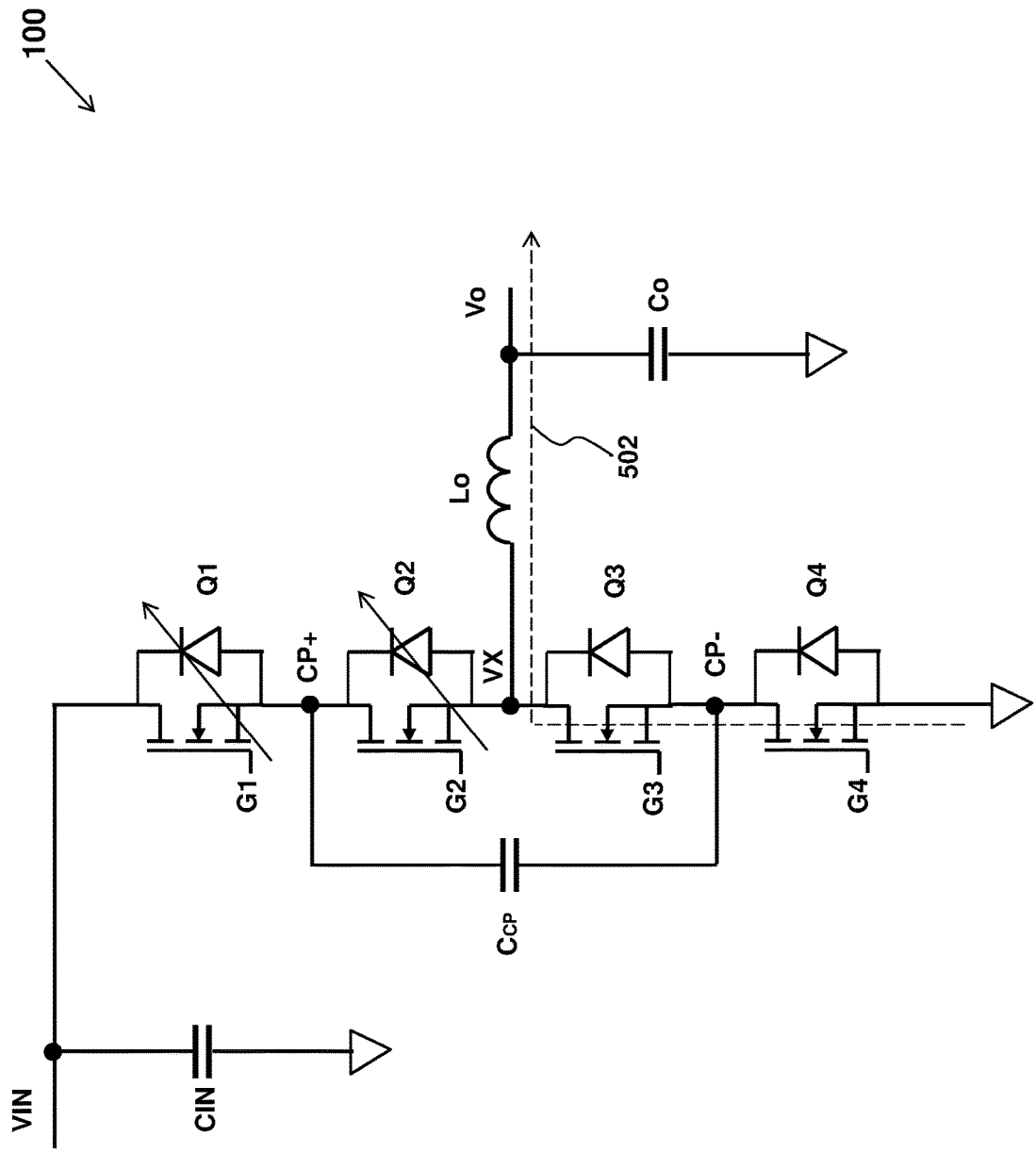
FIG. 5 illustrates the operating principle of the fourth phase of the low duty cycle mode of the multilevel converter shown in FIG. 1 in accordance with various embodiments of the present disclosure.

FIG. 5 illustrates the operating principle of the fourth phase of the low duty cycle mode of the multilevel converter shown in FIG. 1 in accordance with various embodiments of the present disclosure. During the fourth phase of the low duty cycle mode, the first switch Q1 and the second switch Q2 are turned off as indicated by the arrows placed on their symbols, respectively. Since switches Q3 and Q4 are turned on, a conductive path is established as indicated by the dashed line 502 shown in FIG. 5. The conductive path is formed by the fourth switch Q4, the third switch Q3 and output inductor Lo. In some embodiments, the fourth switch Q4 provides a freewheeling path for the current flowing through the output inductor Lo.

During the fourth phase of the low duty cycle mode, the flying capacitor $C_{CP}$ is isolated by the turned-off switches Q1 and Q2. Since the flying capacitor $C_{CP}$ is isolated, the voltage across the flying capacitor $C_{CP}$ is kept constant during the fourth phase of the low duty cycle mode. The current flowing through the inductor Lo ramps down and the energy stored in the inductor Lo decreases accordingly. In the fourth phase of the low duty cycle mode, the current slope S of the inductor Lo satisfies the following equation:

$$S = -Vo/Lo \quad (5)$$

Figure 6:
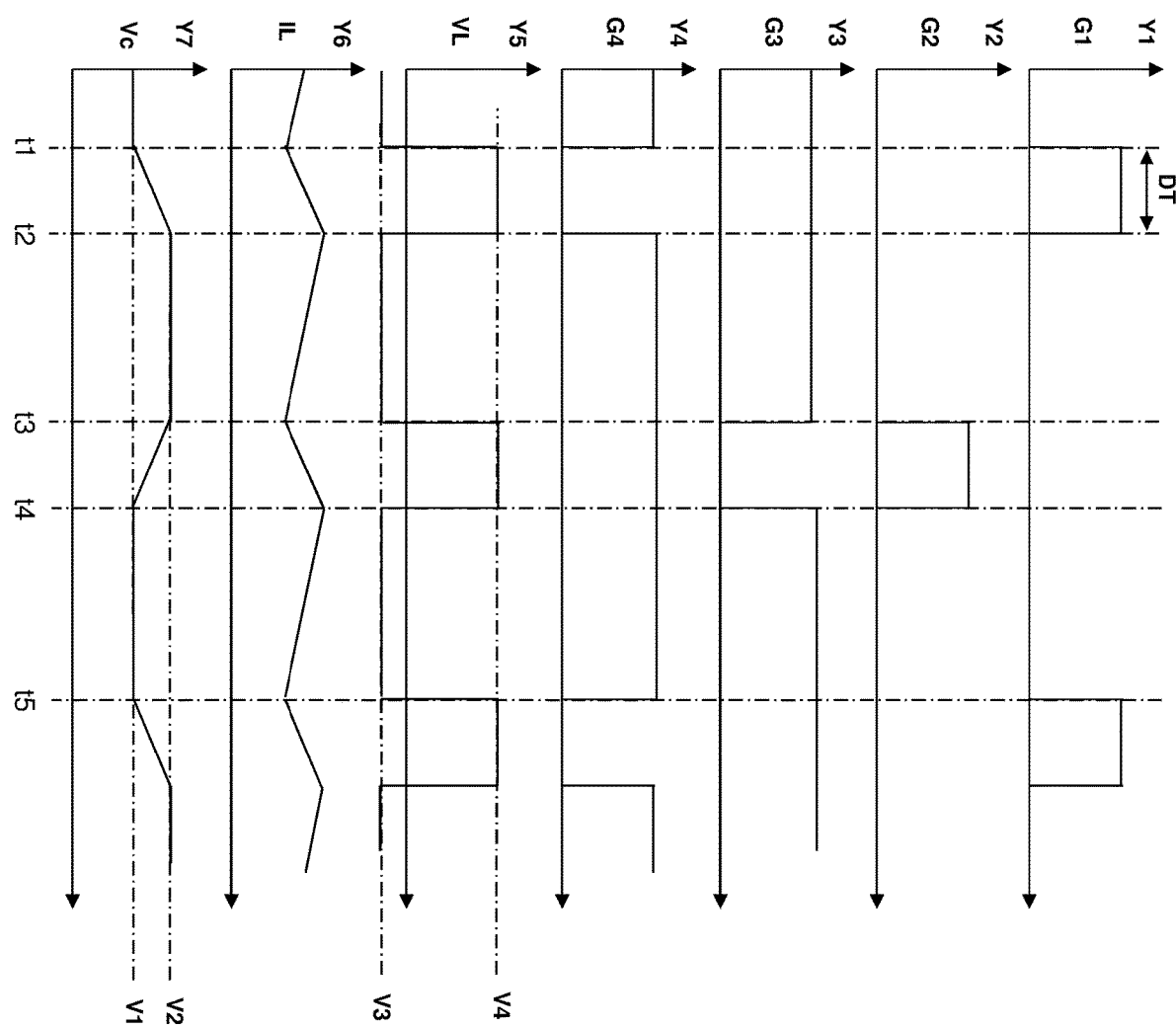
FIG. 6 illustrates a control timing diagram of the low duty cycle mode of the multilevel converter shown in FIG. 1 in accordance with various embodiments of the present disclosure.

FIG. 6 illustrates a control timing diagram of the low duty cycle mode of the multilevel converter shown in FIG. 1 in accordance with various embodiments of the present disclosure. The horizontal axis of FIG. 6 represents intervals of time. There are seven vertical axes. The first vertical axis Y1 represents the gate drive signal of the first switch Q1. The second vertical axis Y2 represents the gate drive signal of the second switch Q2. The third vertical axis Y3 represents the gate drive signal of the third switch Q3. The four vertical axis Y4 represents the gate drive signal of the fourth switch Q4. The fifth vertical axis Y5 represents the voltage applied to the inductor Lo. The sixth vertical axis Y6 represents the current flowing through the inductor Lo. The seventh vertical axis Y7 represents the voltage across the flying capacitor.

One switching cycle of the multilevel converter 100 is from t1 to t5 as shown in FIG. 6. One switching cycle of the multilevel converter 100 can be divided into four phases as described above with respect to FIGS. 2-5. As shown in FIG. 6, the first phase is between time instants t1 and t2. The second phase is between time instants t2 and t3. The third phase is between time instants t3 and t4. The fourth phase is between time instants t4 and t5.

As shown in FIG. 6, the duty cycle of the first switch Q1 is equal to the turn-on time of the first switch Q1 divided by the switching cycle. The turn-on time of the first switch Q1 is equal to the duty cycle times the switching period. The duty cycle of the first switch Q1 is equal to the duty cycle of the second switch Q2. The duty cycle of the first switch Q1 is in a range from 0 to 50%.

In some embodiments, D is equal to a ratio of the output voltage Vo to the input voltage VIN. As shown in FIG. 6, the gate drive signal of the fourth switch Q4 is complementary to the gate drive signal of the first switch Q1. The gate drive signal of the fourth switch Q3 is complementary to the gate drive signal of the first switch Q2. As shown in FIG. 6, there is a delay between a leading edge of the gate drive signal of the first switch Q1 and a leading edge of the gate drive signal of the second switch Q2. The delay is equal to one half of the switching cycle. Likewise, the delay between a leading edge of the gate drive signal of the fourth switch Q4 and a leading edge of the gate drive signal of the third switch Q3 is equal to one half of the switching cycle.

Referring back to FIG. 2, during the first phase (from t1 to t2), switches Q2 and Q4 are turned off. Switches Q1 and Q3 are turned on as shown in FIG. 2. As a result of turning on switches Q1 and Q3, a conductive path is established between VIN and Vo. During the first phase, the flying capacitor is charged and energy is stored in the flying capacitor accordingly. As shown in FIG. 6, during the first phase, the voltage across the flying capacitor is charged from a first voltage potential V1 to a second voltage potential V2. A fourth voltage potential V4 is applied to the inductor Lo. The fourth voltage potential V4 is equal to the difference between one half of the input voltage VIN and the output voltage Vo.

Referring back to FIG. 3, during the second phase (from t2 to t3), switches Q1 and Q2 are turned off. Switches Q3 and Q4 are turned on. As a result of turning on switches Q3 and Q4, a conductive path is established between Vo and ground. During the second phase, the flying capacitor is isolated by the turned-off switches Q1 and Q2. As shown in FIG. 6, the voltage across the flying capacitor is kept constant. From t2 to t3, the voltage across the flying capacitor is equal to the second voltage potential V2. A third voltage potential V3 is applied to the inductor Lo. The third voltage potential V3 is equal to −Vo.

Referring back to FIG. 4, during the third phase (from t3 to t4), switches Q1 and Q3 are turned off. Switches Q2 and Q4 are turned on. As a result of turning on switches Q2 and Q4, a conductive path is established between Vo and ground. During the third phase, the current discharges the flying capacitor and the energy stored in the flying capacitor decreases accordingly. As shown in FIG. 6, during the third phase, the voltage across the flying capacitor is discharged from the second voltage potential V2 to the first voltage potential V1. As shown in FIG. 6, the voltage variation across the flying capacitor during the third phase is equal to the voltage variation across the flying capacitor during the first phase. During the third phase, the fourth voltage potential V4 is applied to the inductor Lo.

Referring back to FIG. 5, during the fourth phase (from t4 to t5), switches Q1 and Q2 are turned off. Switches Q3 and Q4 are turned on. As a result of turning on switches Q3 and Q4, a conductive path is established between Vo and ground. During the fourth phase, the flying capacitor is isolated by the turned-off switches Q1 and Q2. As shown in FIG. 6, the voltage across the flying capacitor is kept constant. From t4 to t5, the voltage across the flying capacitor is equal to the first voltage potential V1. During the fourth phase, the third voltage potential V3 is applied to the inductor Lo.

In the low duty cycle mode, the voltage variation (V2−V1) across the flying capacitor can be used to estimate the average current flowing through the inductor Lo. The average current is used as an average current control variable of a current control loop. The detailed implementation of the current control loop will be described below with respect to FIG. 23.

Depending on different operating conditions, the multilevel converter 100 shown in FIG. 1 may operate either in the low duty cycle mode or the high duty cycle mode. In the high duty cycle mode, the multilevel converter 100 operates in four different phases.

Figure 7:
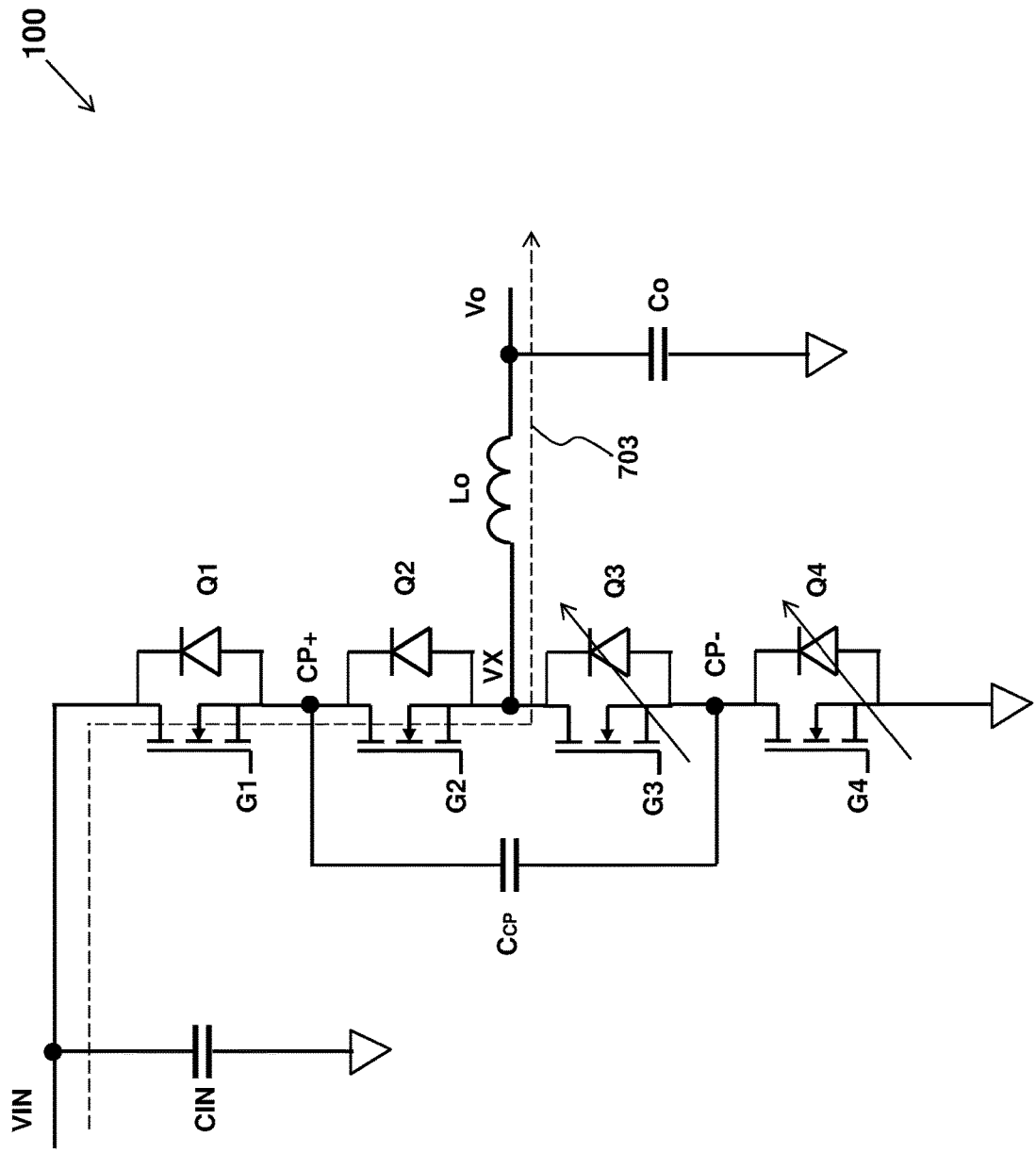
FIG. 7 illustrates the operating principle of the first phase of the high duty cycle mode of the multilevel converter shown in FIG. 1 in accordance with various embodiments of the present disclosure.

FIG. 7 illustrates the operating principle of the first phase of the high duty cycle mode of the multilevel converter shown in FIG. 1 in accordance with various embodiments of the present disclosure. During the first phase of the high duty cycle mode, the third switch Q3 is turned off as indicated by the arrow placed on top of the symbol of the third switch Q3. Likewise, the fourth switch Q4 is turned off as indicated by the arrow placed on top of the symbol of the fourth switch Q4. Since switches Q1 and Q2 are turned on as shown in FIG. 7, a conductive path is established as indicated by the dashed line 703. The conductive path is formed by the first switch Q1, the second switch Q2 and output inductor Lo.

During the first phase of the high duty cycle mode, the flying capacitor $C_{CP}$ is isolated by the turned-off switches Q3 and Q4. The current flowing through the inductor Lo may ramp up or down depending on the voltage applied across the inductor Lo. In some embodiments, when the input voltage VIN is greater than the output voltage Vo, the current flowing through the inductor Lo ramps up and the energy stored in the inductor Lo increases accordingly. The current slope S of the inductor Lo satisfies the following equation:

$$S=(Vin-Vo)/Lo \qquad (6)$$

Figure 8:
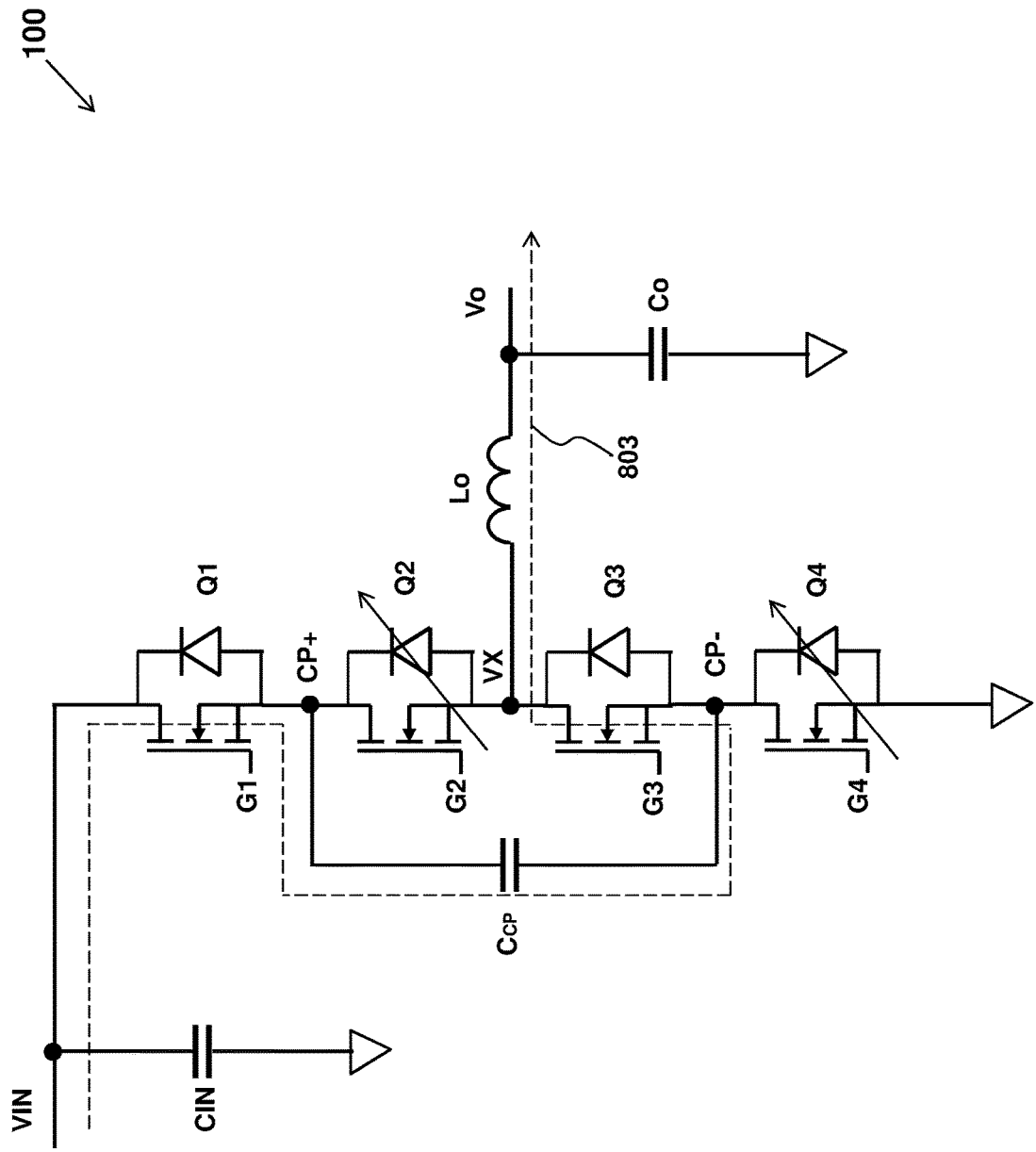
FIG. 8 illustrates the operating principle of the second phase of the high duty cycle mode of the multilevel converter shown in FIG. 1 in accordance with various embodiments of the present disclosure.

FIG. 8 illustrates the operating principle of the second phase of the high duty cycle mode of the multilevel converter shown in FIG. 1 in accordance with various embodiments of the present disclosure. During the second phase of the high duty cycle mode, the second switch Q2 and the fourth switch are turned off as indicated by the arrows placed on top of their symbols, respectively. Since switches Q1 and Q3 are turned on as shown in FIG. 8, a conductive path is established as indicated by the dashed line 803. The conductive path is formed by the first switch Q1, the flying capacitor $C_{CP}$, the third switch Q3 and output inductor Lo. The current flows from the input voltage bus VIN to the output voltage bus Vo through the conductive path shown in FIG. 8.

During the second phase of the high duty cycle mode, the flying capacitor $C_{CP}$ is charged and energy is stored in the flying capacitor $C_{CP}$ accordingly. The current flowing through the inductor Lo may ramp up or down depending on the voltage applied across the inductor Lo. In some embodiments, when the input voltage VIN is less than the sum of the voltage across the flying capacitor $C_{CP}$ and the output voltage Vo, the current flowing through the inductor Lo ramps down and the energy stored in the inductor Lo decreases accordingly. The current slope S of the inductor Lo satisfies the following equation:

$$S=(Vin-Vc-Vo)/Lo \qquad (7)$$

During the second phase of the high duty cycle mode, the voltage variation across the flying capacitor $C_{CP}$ satisfies the following equation:

$$\Delta Vc=(Io\times(1-D))/(fs\times Ccp) \qquad (8)$$

Figure 9:
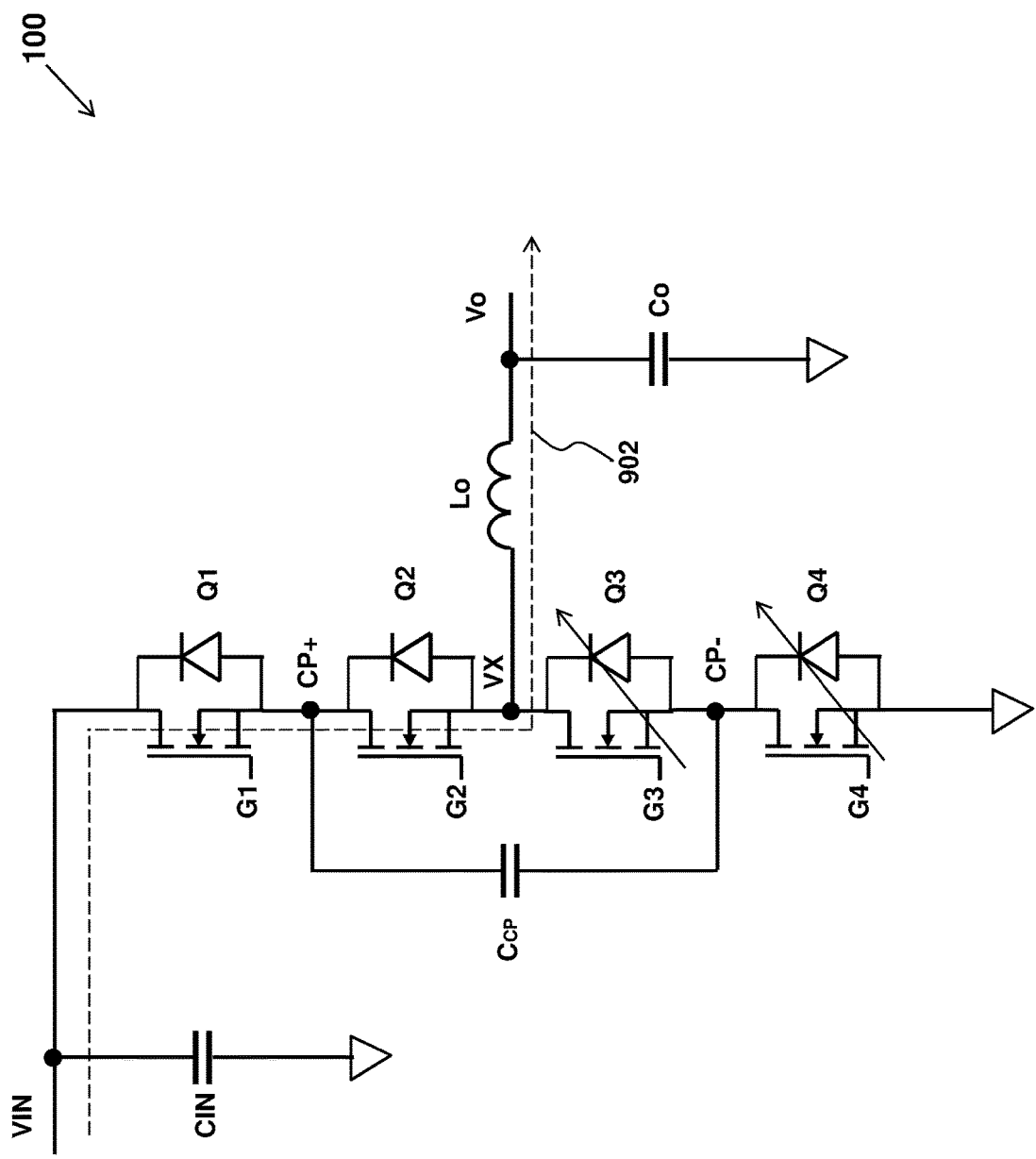
FIG. 9 illustrates the operating principle of the third phase of the high duty cycle mode of the multilevel converter shown in FIG. 1 in accordance with various embodiments of the present disclosure.

FIG. 9 illustrates the operating principle of the third phase of the high duty cycle mode of the multilevel converter shown in FIG. 1 in accordance with various embodiments of the present disclosure. During the third phase of the high duty cycle mode, the third switch Q3 and the fourth switch Q4 are turned off as indicated by the arrows placed on top of their symbols, respectively. Since switches Q1 and Q2 are turned on as shown in FIG. 9, a conductive path is established as indicated by the dashed line 902. The conductive path is formed by the first switch Q1, the second switch Q2 and output inductor Lo.

During the third phase of the high duty cycle mode, the flying capacitor $C_{CP}$ is isolated by the turned-off switches Q3 and Q4. The current flowing through the inductor Lo may ramp up or down depending on the voltage applied across the inductor Lo. In some embodiments, when the input voltage VIN is greater than the output voltage Vo, the current flowing through the inductor Lo ramps up and the energy stored in the inductor Lo increases accordingly. The current slope S of the inductor Lo satisfies the following equation:

$$S=(Vin-Vo)/Lo \qquad (9)$$

During the third phase of the high duty cycle mode, since the flying capacitor $C_{CP}$ is isolated, the voltage across the flying capacitor $C_{CP}$ is kept constant.

Figure 10:
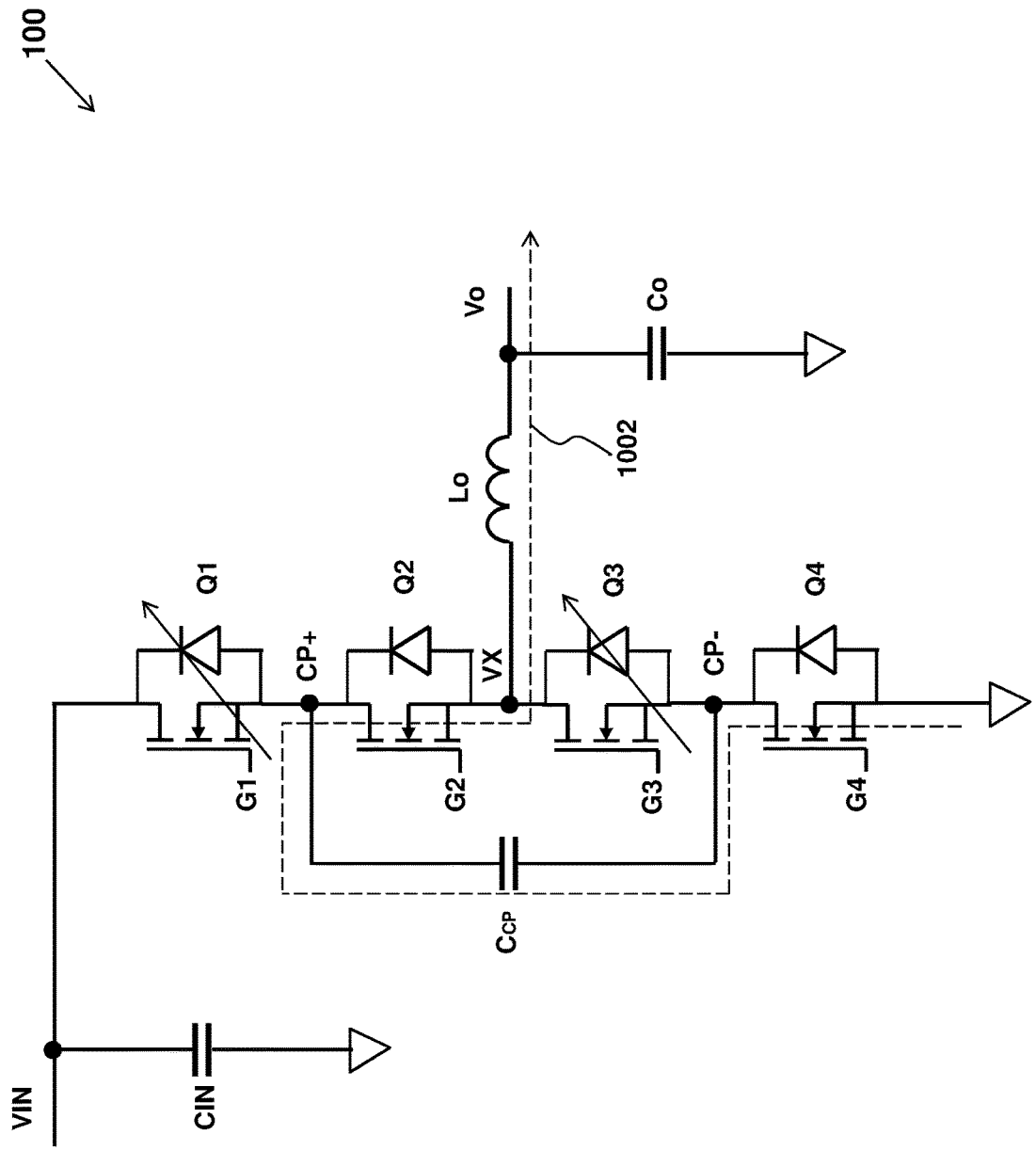
FIG. 10 illustrates the operating principle of the fourth phase of the high duty cycle mode of the multilevel converter shown in FIG. 1 in accordance with various embodiments of the present disclosure.

FIG. 10 illustrates the operating principle of the fourth phase of the high duty cycle mode of the multilevel converter shown in FIG. 1 in accordance with various embodiments of the present disclosure. During the fourth phase of the high duty cycle mode, the first switch Q1 and the third switch Q3 are turned off as indicated by the arrows placed on their symbols, respectively. Since switches Q2 and Q4 are turned on, a conductive path is established as indicated by the dashed line 1002 shown in FIG. 10. The conductive path is formed by the fourth switch Q4, the flying capacitor $C_{CP}$, the second switch Q2 and output inductor Lo.

During the fourth phase of the high duty cycle mode, the current discharges the flying capacitor $C_{CP}$ and the energy stored in the flying capacitor $C_{CP}$ decreases accordingly. In some embodiments, the current flowing through the inductor Lo may ramp down and the energy stored in the inductor Lo decreases accordingly. In the fourth phase of the high duty cycle mode, the current slope S of the inductor Lo satisfies the following equation:

$$S=(Vc-Vo)/Lo \qquad (10)$$

It should be noted that during the fourth phase of the high duty cycle mode, the output voltage Vo is greater than the voltage across the flying capacitor. More particularly, since the duty cycle is greater than 50%, the output voltage Vo is greater than one half of the input voltage VIN. The voltage across the flying capacitor is approximately equal to one half of the input voltage VIN. As a result, the current slope S is of a negative value. The current flowing through the inductor Lo ramps down and the energy stored in the inductor Lo decreases accordingly.

During the fourth phase of the high duty cycle mode, the voltage variation across the flying capacitor $C_{CP}$ is the same as that during the second phase of the high duty cycle mode, and hence is not illustrated herein.

Figure 11:
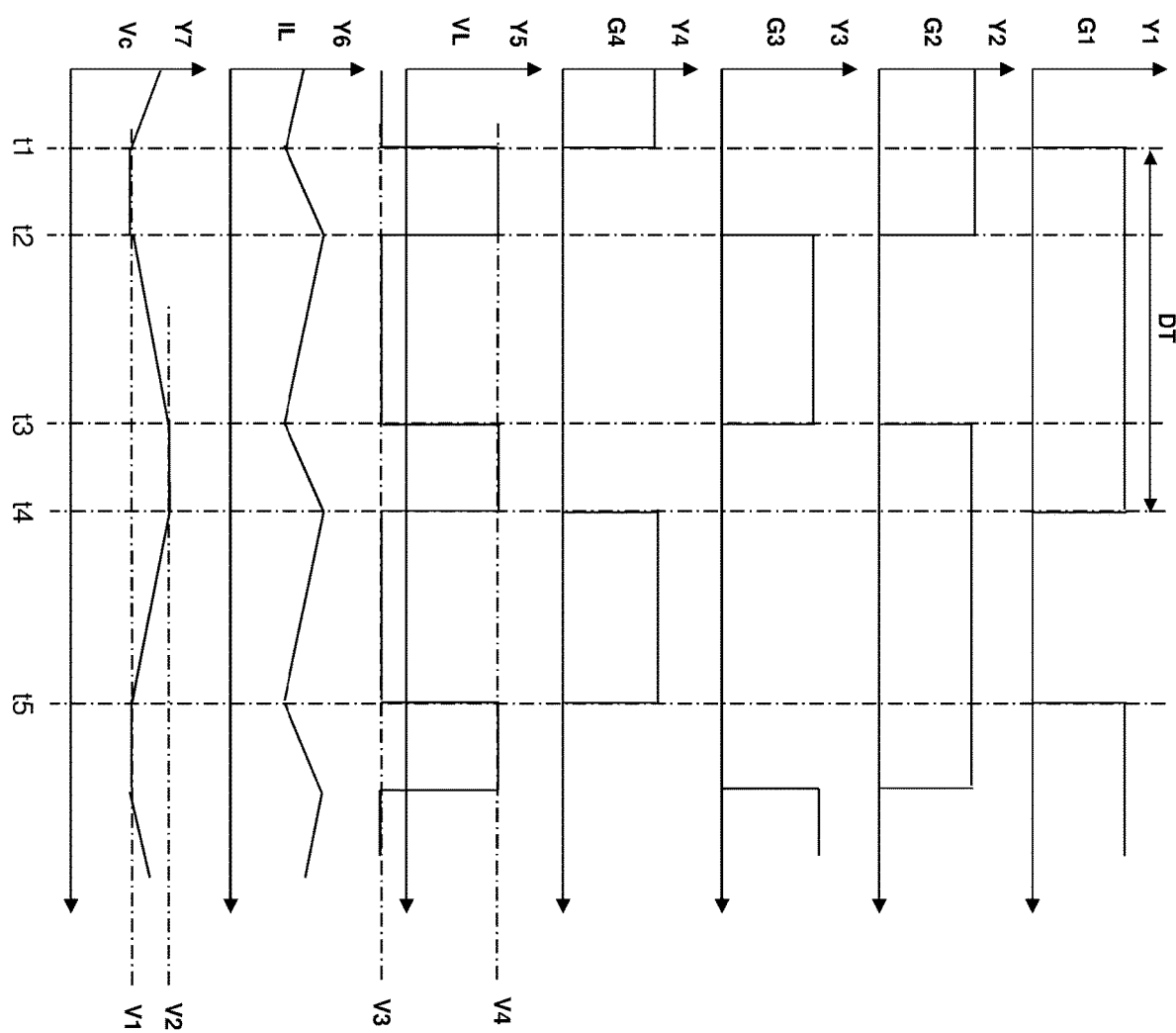
FIG. 11 illustrates a control timing diagram of the high duty cycle mode of the multilevel converter shown in FIG. 1 in accordance with various embodiments of the present disclosure.

FIG. 11 illustrates a control timing diagram of the high duty cycle mode of the multilevel converter shown in FIG. 1 in accordance with various embodiments of the present disclosure. The horizontal axis of FIG. 11 represents intervals of time. There are seven vertical axes. The first vertical axis Y1 represents the gate drive signal of the first switch Q1. The second vertical axis Y2 represents the gate drive signal of the second switch Q2. The third vertical axis Y3 represents the gate drive signal of the third switch Q3. The four vertical axis Y4 represents the gate drive signal of the fourth switch Q4. The fifth vertical axis Y5 represents the voltage applied to the inductor Lo. The sixth vertical axis Y6 represents the current flowing through the inductor Lo. The seventh vertical axis Y7 represents the voltage across the flying capacitor.

One switching cycle of the multilevel converter 100 can be divided into four phases as described above with respect to FIGS. 7-10. As shown in FIG. 11, the first phase is between time instants t1 and t2. The second phase is between time instants t2 and t3. The third phase is between time instants t3 and t4. The fourth phase is between time instants t4 and t5.

As shown in FIG. 11, the duty cycle of the first switch Q1 is equal to the duty cycle of the second switch Q2. The duty cycle of the first switch Q1 is in a range from 50% to 100%. In some embodiments, D is equal to a ratio of the output voltage Vo to the input voltage VIN. The gate drive signal of the fourth switch Q4 is complementary to the gate drive signal of the first switch Q1. The gate drive signal of the fourth switch Q3 is complementary to the gate drive signal of the first switch Q2. As shown in FIG. 11, there is a delay between a leading edge of the gate drive signal of the first switch Q1 and a leading edge of the gate drive signal of the second switch Q2. The delay is equal to one half of the switching cycle. Likewise, the delay between a leading edge of the gate drive signal of the fourth switch Q4 and a leading edge of the gate drive signal of the third switch Q3 is equal to one half of the switching cycle.

Referring back to FIG. 7, during the first phase (from t1 to t2), switches Q3 and Q4 are turned off. Switches Q1 and Q2 are turned on as shown in FIG. 7. As a result of turning on switches Q1 and Q2, a conductive path is established between VIN and Vo. During the first phase, the flying capacitor is isolated by the turned-off switches Q3 and Q4. As shown in FIG. 11, the voltage across the flying capacitor is kept constant. From t1 to t2, the voltage across the flying capacitor is equal to a first voltage potential V1. During the first phase, a fourth voltage potential V4 is applied to the inductor Lo. The fourth voltage potential V4 is equal to the difference between the input voltage VIN and the output voltage Vo.

Referring back to FIG. 8, during the second phase (from t2 to t3), switches Q2 and Q4 are turned off. Switches Q1 and Q3 are turned on. As a result of turning on switches Q3 and Q4, a conductive path is established between VIN and Vo through the flying capacitor. During the second phase, the flying capacitor is charged and energy is stored in the flying capacitor accordingly. As shown in FIG. 11, during the second phase, the voltage across the flying capacitor is charged from the first voltage potential V1 to a second voltage potential V2. A third voltage potential V3 is applied to the inductor Lo. The third voltage potential V3 is equal to the difference between one half of the input voltage VIN and the output voltage Vo.

It should be noted that the third voltage potential V3 is of a negative value as shown in FIG. 11. More particularly, when the duty cycle is greater than 50%, the output voltage Vo is greater than one half of the input voltage VIN. As a result, the third voltage potential V3 is of a negative value.

Referring back to FIG. 9, during the third phase (from t3 to t4), switches Q3 and Q4 are turned off. Switches Q1 and Q2 are turned on. As a result of turning on switches Q1 and Q2, a conductive path is established between VIN and Vo. During the third phase, the flying capacitor is isolated by the turned-off switches Q3 and Q4. As shown in FIG. 11, the voltage across the flying capacitor is kept constant. From t3 to t4, the voltage across the flying capacitor is equal to the second voltage potential V2. During the third phase, the fourth voltage potential V4 is applied to the inductor Vo again.

Referring back to FIG. 10, during the fourth phase (from t4 to t5), switches Q1 and Q3 are turned off. Switches Q2 and Q4 are turned on. As a result of turning on switches Q2 and Q4, a conductive path is established between Vo and ground through the flying capacitor. During the fourth phase, the current discharges the flying capacitor and the energy stored in the flying capacitor decreases accordingly. During the fourth phase, the third voltage potential V3 is applied to the inductor Vo again.

As shown in FIG. 11, during the fourth phase, the voltage across the flying capacitor is discharged from the second voltage potential V2 to the first voltage potential V1. As shown in FIG. 11, the voltage variation across the flying capacitor during the fourth phase (from t4 to t5) is equal to the voltage variation across the flying capacitor during the second phase (from t2 to t3).

In the high duty cycle mode, the voltage variation (V2-V1) shown in FIG. 11 can be used to estimate the average current flowing through the inductor Lo. The average current is used as an average current control variable of a current control loop. The detailed implementation of the current control loop will be described below with respect to FIG. 23.

Figure 12:
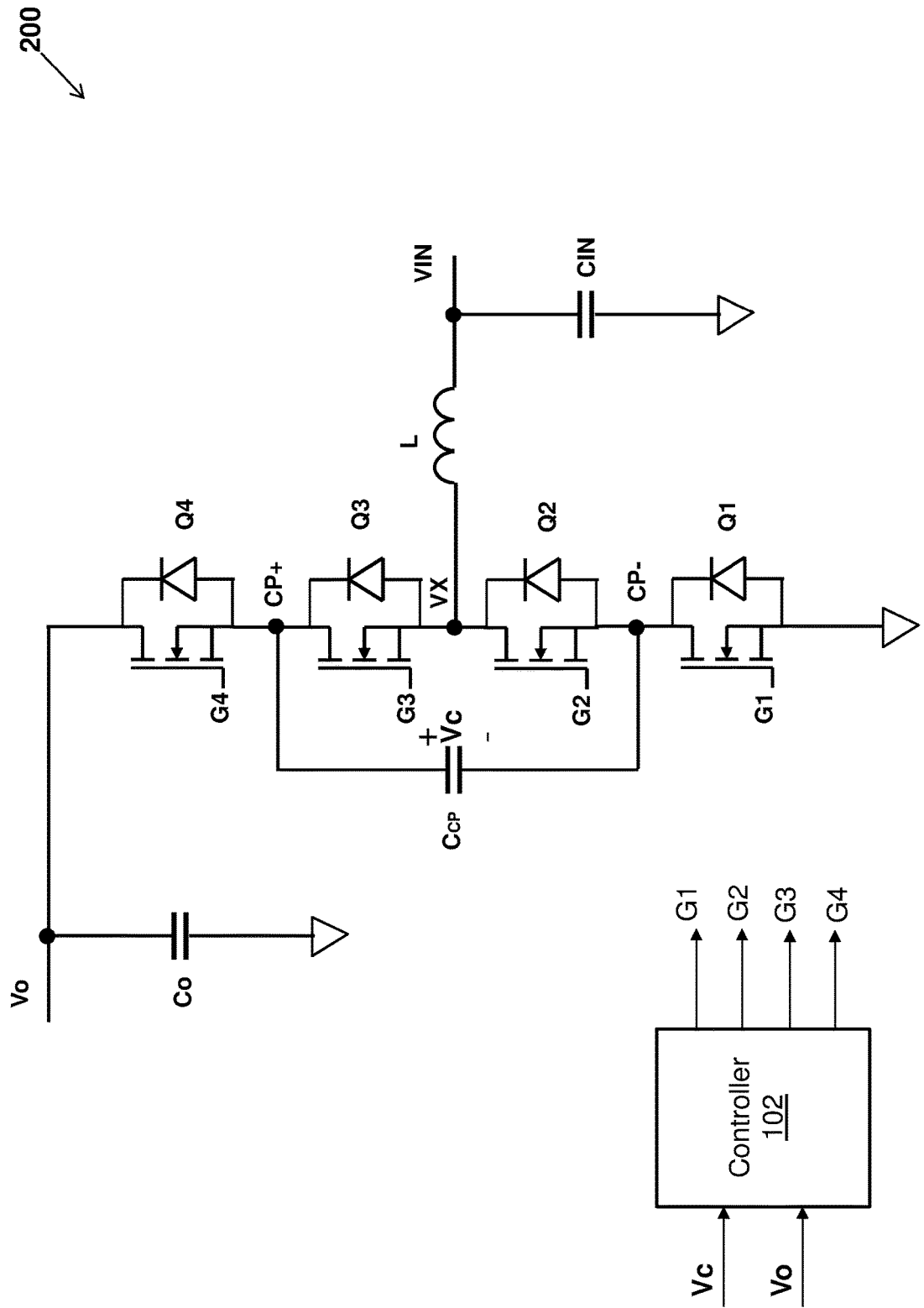
FIG. 12 illustrates a schematic diagram of another multilevel converter in accordance with various embodiments of the present disclosure.

FIG. 12 illustrates a schematic diagram of another multilevel converter in accordance with various embodiments of the present disclosure. The multilevel converter 200 shown in FIG. 12 is similar to the multilevel converter 100 shown in FIG. 1 except that the power source is connected to the inductor L. In other words, the input voltage bus VIN and the output voltage bus Vo are swapped to form a multilevel boost converter. The multilevel converter 200 is a multilevel step-up (boost) converter. The output voltage of the multilevel converter 200 is equal to VIN/(1−D). In some embodiments, D is the duty cycle of the gate drive signal applied to the first switch Q1. In a steady state operation mode, the average voltage across the flying capacitor $C_{CP}$ is equal to one half of the output voltage Vo. It should be noted that, for an N-level converter, the average voltage across each flying capacitor is equal to Vo divided by (N−1).

The multilevel converter 200 includes two different operating modes, namely a low duty cycle mode and a high duty cycle mode. In some embodiments, when the duty cycle of the gate drive signal applied to the first switch Q1 is less than or equal to 50%, the multilevel converter 200 operates in the low duty cycle mode. When the duty cycle of the gate drive signal applied to the first switch Q1 is greater than 50%, the multilevel converter 200 operates in the high duty cycle mode.

In the low duty cycle mode, the multilevel converter 200 operates in four different phases. In each phase, the current flowing through the inductor L may ramp up or down depending on different combinations of the input voltage VIN, the voltage across the flying capacitor $C_{CP}$ and the output voltage Vo. In the low duty cycle mode, the voltage of the multilevel converter 200 can be regulated to a predetermined voltage. The detailed operating principles of the low duty cycle mode of the multilevel converter 200 will be described below with respect to FIGS. 13-17.

In the high duty cycle mode, the multilevel converter 200 operates in four different phases. In each phase, the current flowing through the inductor L may ramp up or down depending on different combinations of the input voltage VIN, the voltage across the flying capacitor $C_{CP}$ and the output voltage Vo. In the high duty cycle mode, the voltage of the multilevel converter 200 can be regulated to a predetermined voltage. The detailed operating principles of the high duty cycle mode of the multilevel converter 200 will be described below with respect to FIGS. 18-22.

Figure 13:
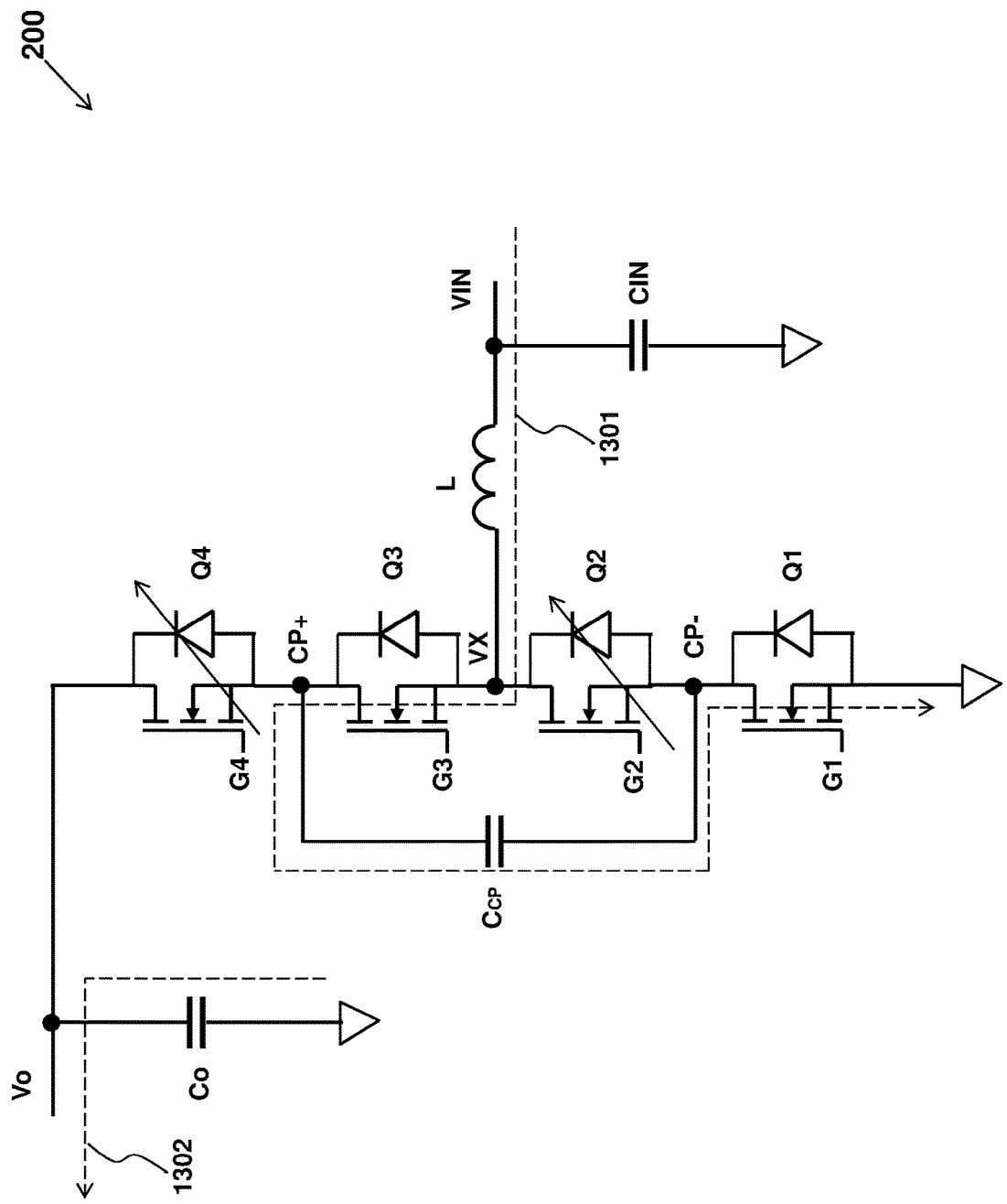
FIG. 13 illustrates the operating principle of the first phase of the low duty cycle mode of the multilevel converter shown in FIG. 12 in accordance with various embodiments of the present disclosure.

FIG. 13 illustrates the operating principle of the first phase of the low duty cycle mode of the multilevel converter shown in FIG. 12 in accordance with various embodiments of the present disclosure. During the first phase of the low duty cycle mode, the second switch Q2 is turned off as indicated by the arrow placed on top of the symbol of the second switch Q2. Likewise, the fourth switch Q4 is turned off as indicated by the arrow placed on top of the symbol of the fourth switch Q4. Since switches Q1 and Q3 are turned on as shown in FIG. 13, a first conductive path is established as indicated by the dashed line 1301. The first conductive path is formed by the first switch Q1, the flying capacitor $C_{CP}$, the third switch Q3 and the inductor L. The current flows from the input voltage bus VIN to the ground through the first conductive path shown in FIG. 13. A second conductive path is established as indicated by the dashed line 1302. The energy stored in the output capacitor Co is used to supply the load connected to the output voltage bus Vo.

During the first phase of the low duty cycle mode, the flying capacitor $C_{CP}$ is charged and energy is stored in the flying capacitor $C_{CP}$ accordingly. The current flowing through the inductor L ramps up because the input voltage VIN is greater than the voltage across the flying capacitor $C_{CP}$. Since the current flowing through the inductor L ramps up, the energy stored in the inductor L. The current slope S of the inductor L satisfies the following equation:

$$S=(Vin-Vc)/L \tag{11}$$

During the first phase of the low duty cycle mode, the voltage variation across the flying capacitor $C_{CP}$ satisfies the following equations:

$$M=1/(1-D) \tag{12}$$

$$\Delta Vc=(Io \times M \times D)/(fs \times Ccp) \tag{13}$$

where D is the duty cycle of the multilevel converter 200, and fs is the switching frequency of the multilevel converter 200. It should be noted that D is equal to the turn-on time of the first switch Q1 divided by the switching cycle of the multilevel converter 200.

Figure 14:
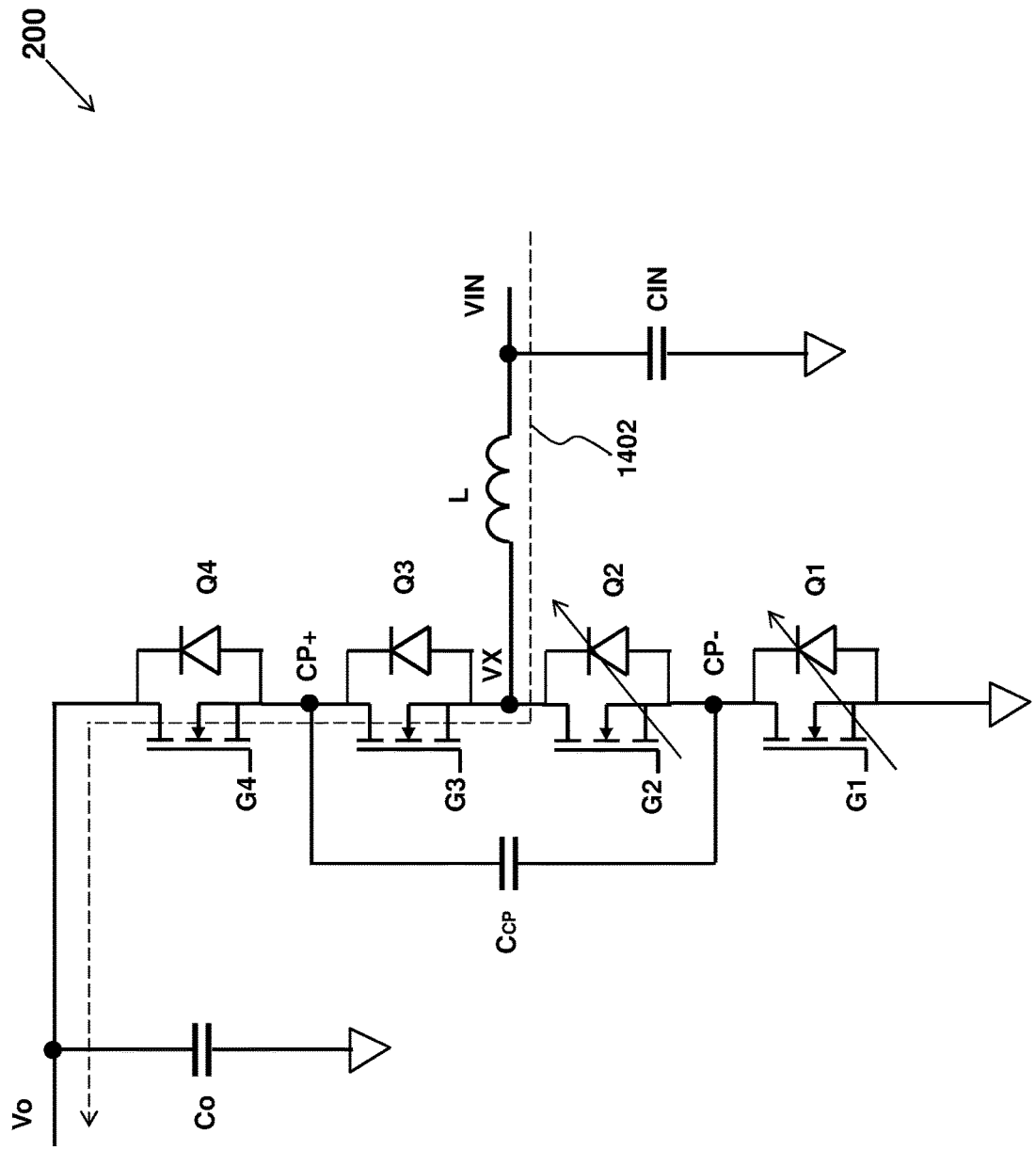
FIG. 14 illustrates the operating principle of the second phase of the low duty cycle mode of the multilevel converter shown in FIG. 12 in accordance with various embodiments of the present disclosure.

FIG. 14 illustrates the operating principle of the second phase of the low duty cycle mode of the multilevel converter shown in FIG. 12 in accordance with various embodiments of the present disclosure. During the second phase of the low duty cycle mode, the first switch Q1 and the third switch Q2 are turned off as indicated by the arrows placed on their symbols. Since switches Q3 and Q4 are turned on, a conductive path is established as indicated by the dashed line 1402 shown in FIG. 14. The conductive path is formed by the fourth switch Q4, the third switch Q3 and the inductor L.

During the second phase of the low duty cycle mode, the flying capacitor $C_{CP}$ is isolated by the turned-off switches Q1 and Q2. The voltage across the flying capacitor $C_{CP}$ is kept constant. The current flowing through the inductor L ramps down and the energy stored in the inductor L decreases accordingly. The current slope S of the inductor L satisfies the following equation:

$$S=(VIN-Vo)/L \tag{14}$$

Figure 15:
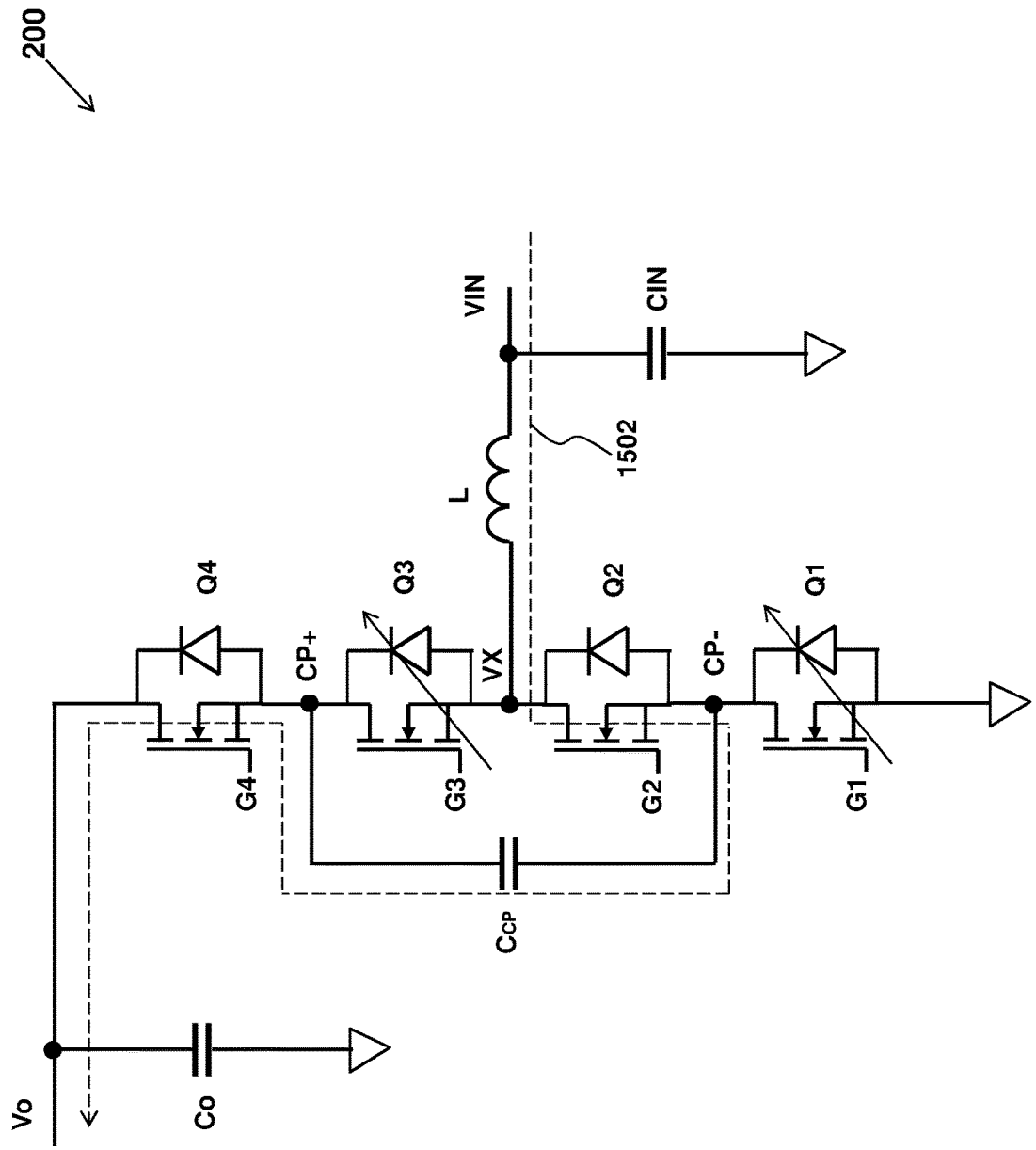
FIG. 15 illustrates the operating principle of the third phase of the low duty cycle mode of the multilevel converter shown in FIG. 12 in accordance with various embodiments of the present disclosure.

FIG. 15 illustrates the operating principle of the third phase of the low duty cycle mode of the multilevel converter shown in FIG. 12 in accordance with various embodiments of the present disclosure. During the third phase of the low duty cycle mode, the first switch Q1 and the third switch Q3 are turned off as indicated by the arrows placed on their symbols. Since switches Q2 and Q4 are turned on, a conductive path is established as indicated by the dashed line 1502 shown in FIG. 15. The conductive path is formed by the fourth switch Q4, the flying capacitor $C_{CP}$, the second switch Q2 and the inductor L.

During the third phase of the low duty cycle mode, the current discharges the flying capacitor $C_{CP}$ and the energy stored in the flying capacitor $C_{CP}$ decreases accordingly. In some embodiments, the current flowing through the inductor L ramps up and the energy stored in the inductor L increases accordingly. In the third phase of the low duty cycle mode, the current slope S of the inductor L satisfies the following equation:

$$S=(VIN+Vc-Vo)/L \tag{15}$$

During the third phase of the low duty cycle mode, the voltage variation across the flying capacitor $C_{CP}$ is the same as that during the first phase of the low duty cycle mode, and hence is not illustrated herein.

Figure 16:
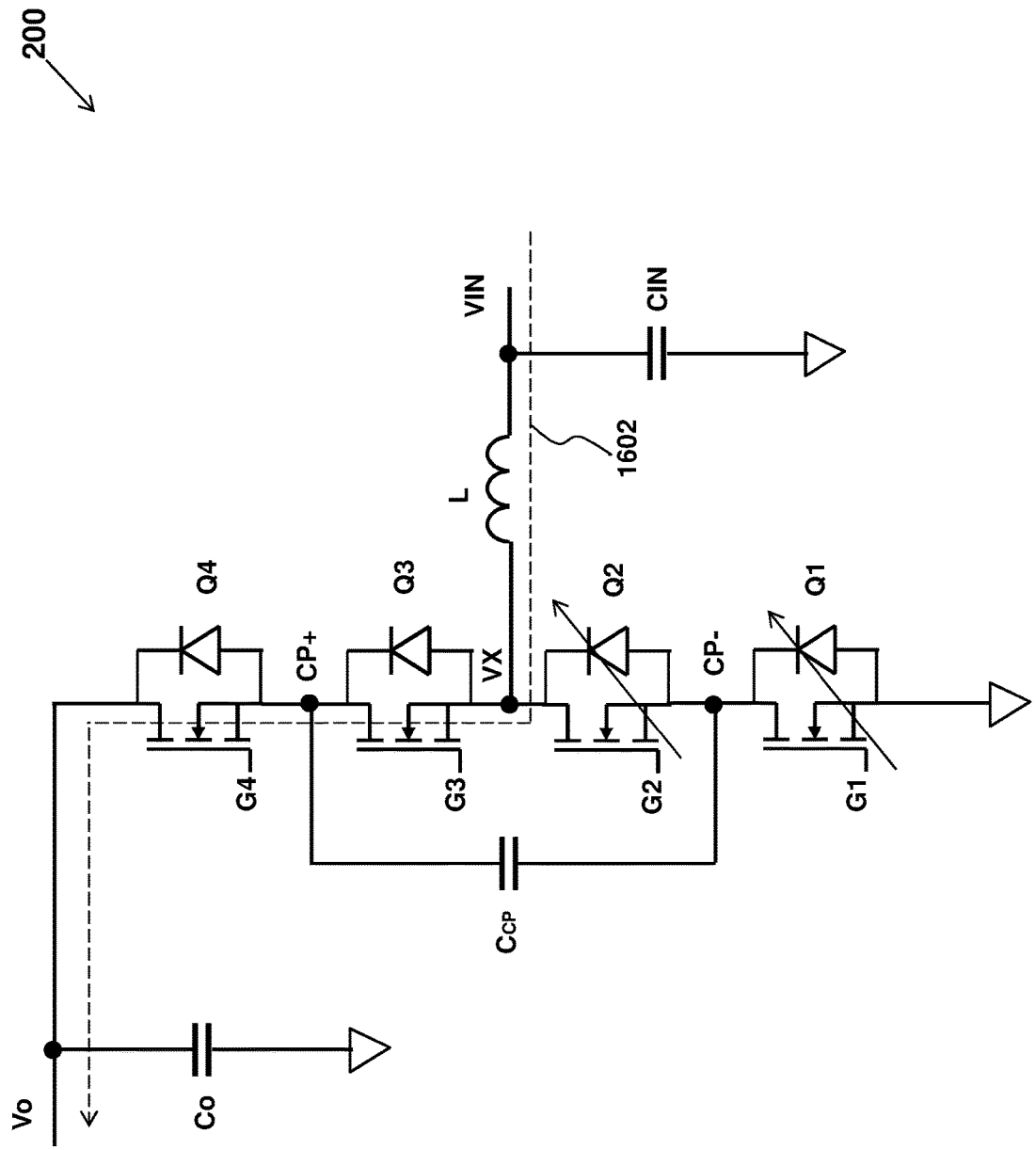
FIG. 16 illustrates the operating principle of the fourth phase of the low duty cycle mode of the multilevel converter shown in FIG. 12 in accordance with various embodiments of the present disclosure.

FIG. 16 illustrates the operating principle of the fourth phase of the low duty cycle mode of the multilevel converter shown in FIG. 12 in accordance with various embodiments of the present disclosure. During the fourth phase of the low duty cycle mode, the first switch Q1 and the second switch Q2 are turned off as indicated by the arrows placed on their symbols. Since switches Q3 and Q4 are turned on, a conductive path is established as indicated by the dashed line 1602 shown in FIG. 16. The conductive path is formed by the fourth switch Q4, the third switch Q3 and the inductor L.

During the fourth phase of the low duty cycle mode, the flying capacitor $C_{CP}$ is isolated by the turned-off switches Q1 and Q2. The voltage across the flying capacitor $C_{CP}$ is kept constant. The current flowing through the inductor L ramps down and the energy stored in the inductor L decreases accordingly. In the fourth phase of the low duty cycle mode, the current slope S of the inductor L satisfies the following equation:

$$S=(VIN-Vo)/L \tag{16}$$

Figure 17:
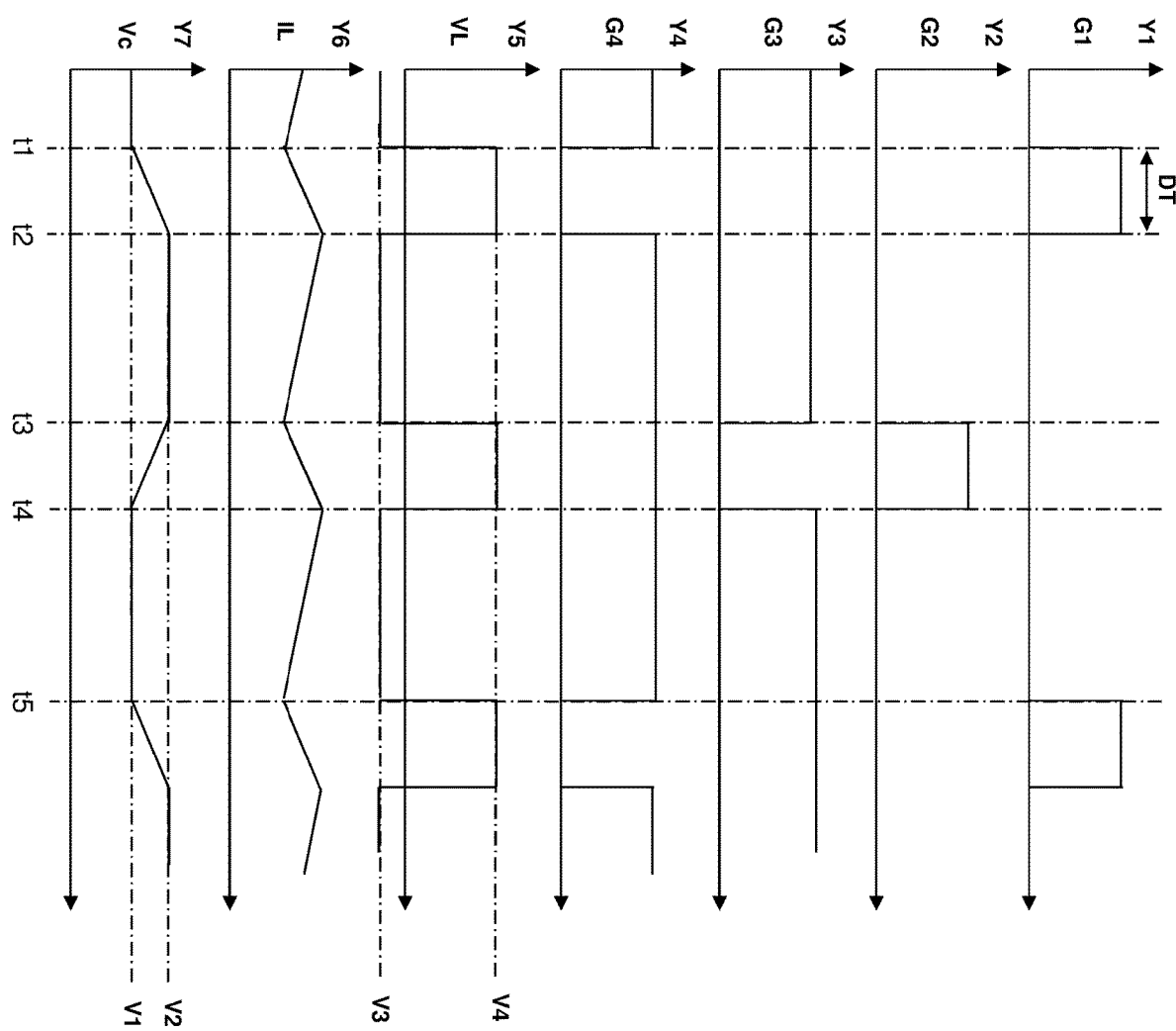
FIG. 17 illustrates a control timing diagram of the low duty cycle mode of the multilevel converter shown in FIG. 12 in accordance with various embodiments of the present disclosure.

FIG. 17 illustrates a control timing diagram of the low duty cycle mode of the multilevel converter shown in FIG. 12 in accordance with various embodiments of the present disclosure. The horizontal axis of FIG. 17 represents intervals of time. There are seven vertical axes. The first vertical axis Y1 represents the gate drive signal of the first switch Q1. The second vertical axis Y2 represents the gate drive signal of the second switch Q2. The third vertical axis Y3 represents the gate drive signal of the third switch Q3. The four vertical axis Y4 represents the gate drive signal of the fourth switch Q4. The fifth vertical axis Y5 represents the voltage applied to the inductor L. The sixth vertical axis Y6 represents the current flowing through the inductor L. The seventh vertical axis Y7 represents the voltage across the flying capacitor.

One switching cycle of the multilevel converter 200 can be divided into four phases as described above with respect to FIGS. 13-16. As shown in FIG. 17, the first phase is between time instants t1 and t2. The second phase is between time instants t2 and t3. The third phase is between time instants t3 and t4. The fourth phase is between time instants t4 and t5.

As shown in FIG. 17, the duty cycle of the first switch Q1 is equal to the duty cycle of the second switch Q2. The duty cycle of the first switch Q1 is in a range from 0 to 50%. In some embodiments, D is equal to the turn-on time of the first switch Q1 divided by the switching cycle of the multilevel converter 200. The gate drive signal of the fourth switch Q4 is complementary to the gate drive signal of the first switch Q1. The gate drive signal of the fourth switch Q3 is complementary to the gate drive signal of the first switch Q2. As shown in FIG. 17, there is a delay between a leading edge of the gate drive signal of the first switch Q1 and a leading edge of the gate drive signal of the second switch Q2. The delay is equal to one half of the switching cycle. Likewise, the delay between a leading edge of the gate drive signal of the fourth switch Q4 and a leading edge of the gate drive signal of the third switch Q3 is equal to one half of the switching cycle.

Referring back to FIG. 13, during the first phase (from t1 to t2), switches Q2 and Q4 are turned off. Switches Q1 and Q3 are turned on as shown in FIG. 13. As a result of turning on switches Q1 and Q3, a conductive path is established between VIN and ground. During the first phase, the flying capacitor is charged and energy is stored in the flying capacitor accordingly. As shown in FIG. 17, during the first phase, the voltage across the flying capacitor is charged from a first voltage potential V1 to a second voltage potential V2. During the first phase, a fourth voltage potential V4 is applied to the inductor L. The fourth voltage potential V4 is equal to the difference between the input voltage VIN and one half of the output voltage Vo.

Referring back to FIG. 14, during the second phase (from t2 to t3), switches Q1 and Q2 are turned off. Switches Q3 and Q4 are turned on. As a result of turning on switches Q3 and Q4, a conductive path is established between VIN and Vo. During the second phase, the flying capacitor is isolated by the turned-off switches Q1 and Q2. As shown in FIG. 17, the voltage across the flying capacitor is kept constant. From t2 to t3, the voltage across the flying capacitor is equal to the second voltage potential V2. A third voltage potential V3 is applied to the inductor L. The third voltage potential V3 is equal to the difference between the input voltage VIN and the output voltage Vo.

It should be noted that the third voltage potential V3 is of a negative value as shown in FIG. 17. More particularly, the multilevel converter 200 shown in FIG. 12 is configured as a boost converter. The output voltage Vo is greater than the input voltage VIN. As a result, the third voltage potential V3 is of a negative value.

Referring back to FIG. 15, during the third phase (from t3 to t4), switches Q1 and Q3 are turned off. Switches Q2 and Q4 are turned on. As a result of turning on switches Q2 and Q4, a conductive path is established between VIN and Vo. During the third phase, the current discharges the flying capacitor and the energy stored in the flying capacitor decreases accordingly. As shown in FIG. 17, during the third phase, the voltage across the flying capacitor is discharged from the second voltage potential V2 to the first voltage potential V1. As shown in FIG. 17, the voltage variation across the flying capacitor during the third phase is equal to the voltage variation across the flying capacitor during the first phase. During the third phase, the fourth voltage potential V4 is applied to the inductor L again.

Referring back to FIG. 16, during the fourth phase (from t4 to t5), switches Q1 and Q2 are turned off. Switches Q3 and Q4 are turned on. As a result of turning on switches Q3 and Q4, a conductive path is established between VIN and Vo. During the fourth phase, the flying capacitor is isolated by the turned-off switches Q1 and Q2. As shown in FIG. 17, the voltage across the flying capacitor is kept constant. From t4 to t5, the voltage across the flying capacitor is equal to the first voltage potential V1. During the fourth phase, the third voltage potential V3 is applied to the inductor L again.

In the low duty cycle mode, the voltage variation (V2-V1) shown in FIG. 17 can be used to estimate the average current flowing through the inductor L. The average current is used as an average current control variable of a current control loop. The detailed implementation of the current control loop will be described below with respect to FIG. 23.

Figure 18:
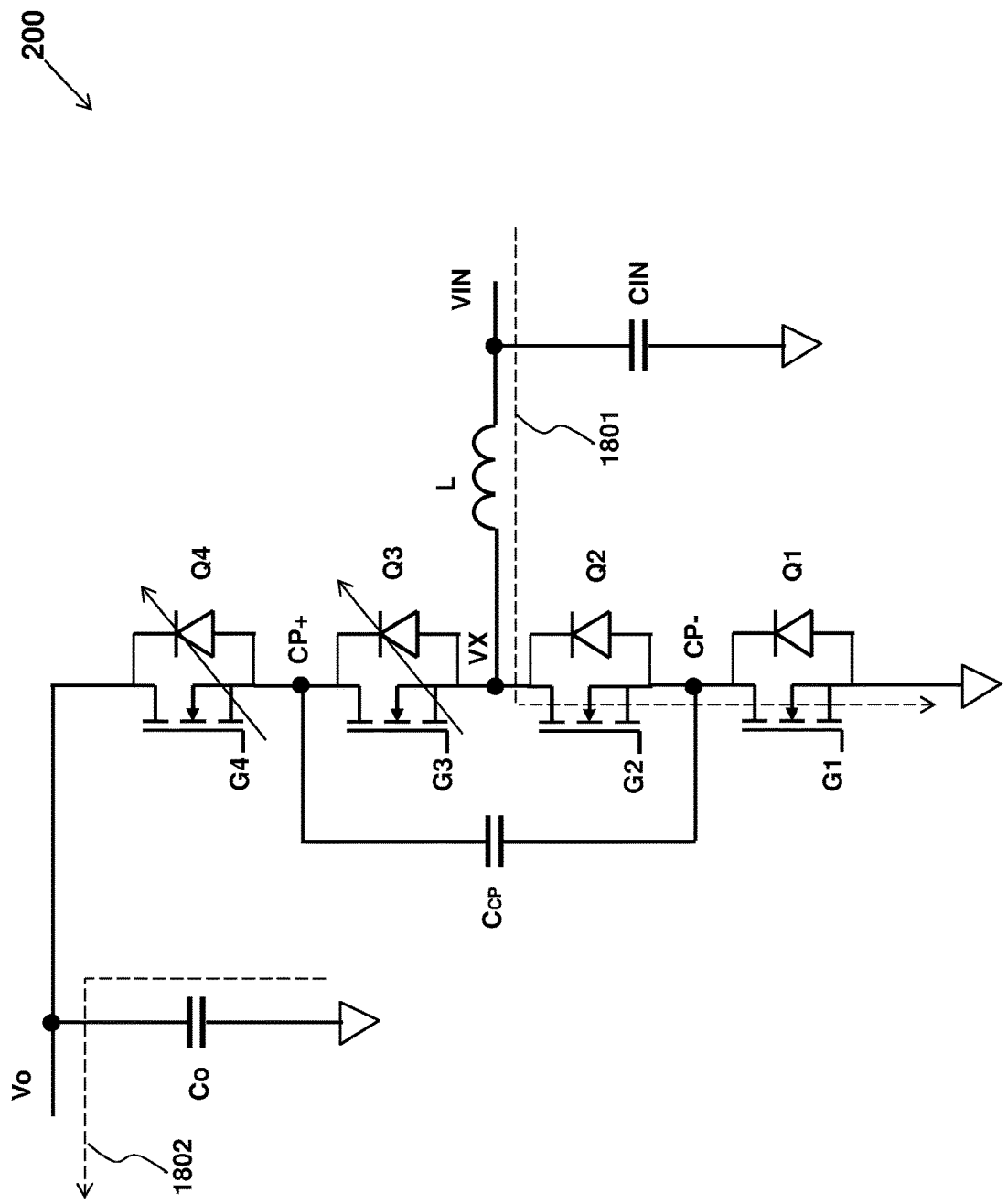
FIG. 18 illustrates the operating principle of the first phase of the high duty cycle mode of the multilevel converter shown in FIG. 12 in accordance with various embodiments of the present disclosure.

FIG. 18 illustrates the operating principle of the first phase of the high duty cycle mode of the multilevel converter shown in FIG. 12 in accordance with various embodiments of the present disclosure. During the first phase of the high duty cycle mode, the third switch Q3 is turned off as indicated by the arrow placed on top of the symbol of the third switch Q3. Likewise, the fourth switch Q4 is turned off as indicated by the arrow placed on top of the symbol of the fourth switch Q4. Since switches Q1 and Q2 are turned on as shown in FIG. 18, a first conductive path is established as indicated by the dashed line 1801. The first conductive path is formed by the first switch Q1, the second switch Q2 and the inductor L. The current flows from the input voltage bus VIN to the ground through the first conductive path shown in FIG. 18. A second conductive path is established as indicated by the dashed line 1802. The energy stored in the output capacitor Co is used to supply the load connected to the output voltage bus Vo.

During the first phase of the high duty cycle mode, the flying capacitor $C_{CP}$ is isolated by the turned-off switches Q3 and Q4. The current flowing through the inductor L ramps up because the input voltage VIN is applied to the inductor L directly. Since the current flowing through the inductor L ramps up, the energy stored in the inductor L increases accordingly. The current slope S of the inductor L satisfies the following equation:

$$S = Vin/Lo \qquad (17)$$

Figure 19:
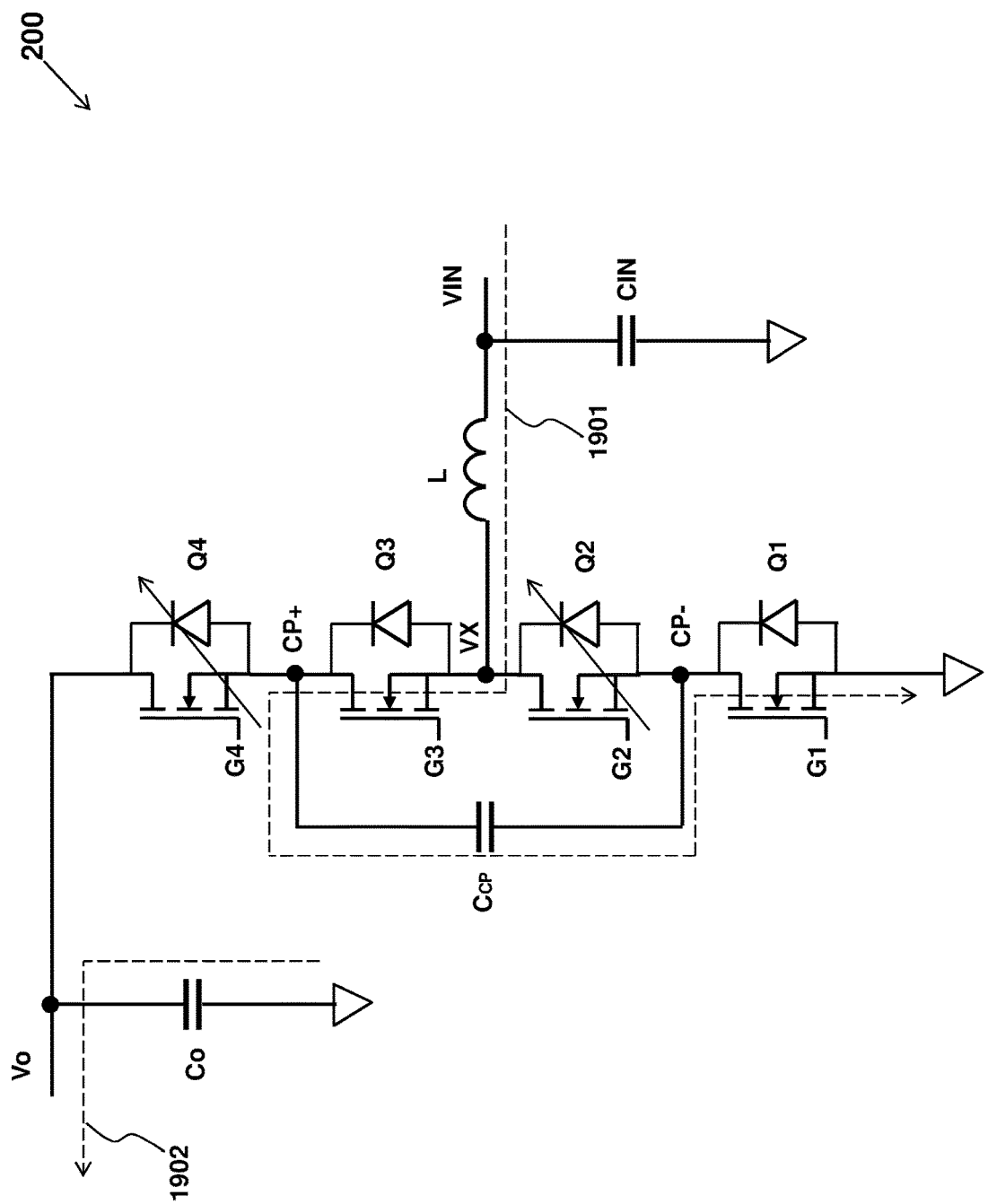
FIG. 19 illustrates the operating principle of the second phase of the high duty cycle mode of the multilevel converter shown in FIG. 12 in accordance with various embodiments of the present disclosure.

FIG. 19 illustrates the operating principle of the second phase of the high duty cycle mode of the multilevel converter shown in FIG. 12 in accordance with various embodiments of the present disclosure. During the second phase of the high duty cycle mode, the second switch Q2 and the fourth switch Q4 are turned off as indicated by the arrows placed on top of their symbols, respectively. Since switches Q1 and Q3 are turned on as shown in FIG. 19, a first conductive path is established as indicated by the dashed line 1901. The first conductive path is formed by the first switch Q1, the flying capacitor $C_{CP}$, the third switch Q3 and the inductor L. The current flows from the input voltage bus VIN to the ground through the first conductive path shown in FIG. 19. A second conductive path is established as indicated by the dashed line 1902. The energy stored in the output capacitor Co is used to supply the load connected to the output voltage bus Vo.

During the second phase of the high duty cycle mode, the flying capacitor $C_{CP}$ is charged and energy is stored in the flying capacitor $C_{CP}$ accordingly. The current flowing through the inductor L ramps down because the input voltage VIN is less than the voltage across the flying capacitor $C_{CP}$. Since the current flowing through the inductor L ramps down, the energy stored in the inductor L decreases accordingly. The current slope S of the inductor L satisfies the following equation:

$$S = (Vin - Vc)/L \qquad (18)$$

During the high duty cycle mode, the output voltage Vo is greater than two times input voltage VIN. The voltage across the flying capacitor is equal to one half of the output voltage Vo. As a result, the input voltage VIN is less than the voltage across the flying capacitor (Vc). The current slope S in Equation (18) is of a negative value.

During the second phase of the high duty cycle mode, the voltage variation across the flying capacitor $C_{CP}$ satisfies the following equations:

$$M = 1/(1-D) \qquad (19)$$

$$\Delta Vc = (M \times Io \times (1-D))/(fs \times Ccp) \qquad (20)$$

Figure 20:
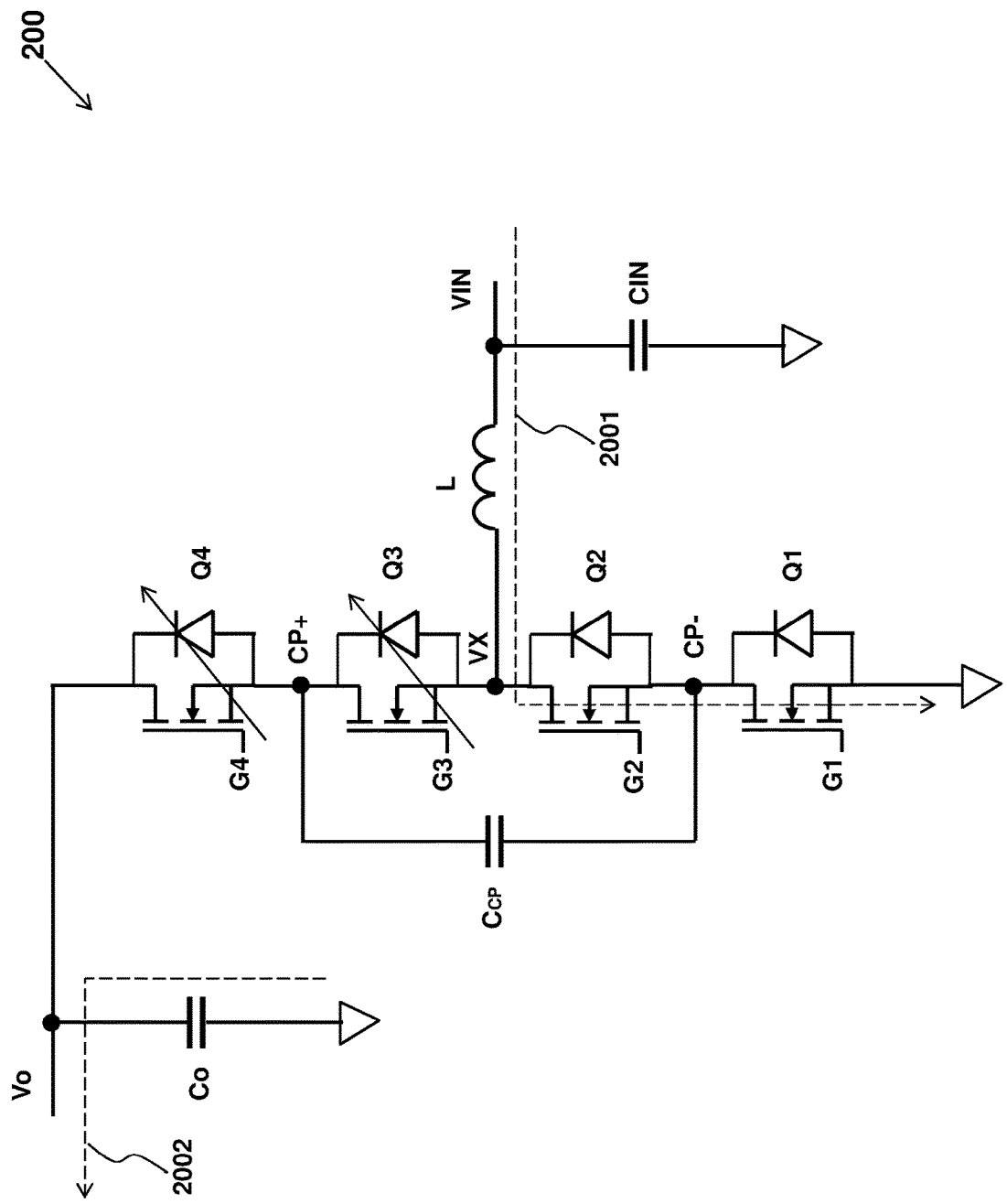
FIG. 20 illustrates the operating principle of the third phase of the high duty cycle mode of the multilevel converter shown in FIG. 12 in accordance with various embodiments of the present disclosure.

FIG. 20 illustrates the operating principle of the third phase of the high duty cycle mode of the multilevel converter shown in FIG. 12 in accordance with various embodiments of the present disclosure. During the third phase of the high duty cycle mode, the third switch Q3 and the fourth switch Q4 are turned off as indicated by the arrows placed on top of their symbols, respectively. Since switches Q1 and Q2 are turned on as shown in FIG. 20, a first conductive path is established as indicated by the dashed line 2001. The first conductive path is formed by the first switch Q1, the second switch Q2 and the inductor L. The current flows from the input voltage bus VIN to the ground through the first conductive path shown in FIG. 20. A second conductive path is established as indicated by the dashed line 2002. The energy stored in the output capacitor Co is used to supply the load connected to the output voltage bus Vo.

During the third phase of the high duty cycle mode, the flying capacitor $C_{CP}$ is isolated by the turned-off switches Q3 and Q4. The current flowing through the inductor L ramps up because the input voltage VIN is applied to the inductor L directly. Since the current flowing through the inductor L ramps up, the energy stored in the inductor L increases accordingly. The current slope S of the inductor L satisfies the following equation:

$$S=Vin/Lo \tag{21}$$

During the third phase of the high duty cycle mode, since the flying capacitor $C_{CP}$ is isolated, the voltage across the flying capacitor $C_{CP}$ is kept constant.

Figure 21:
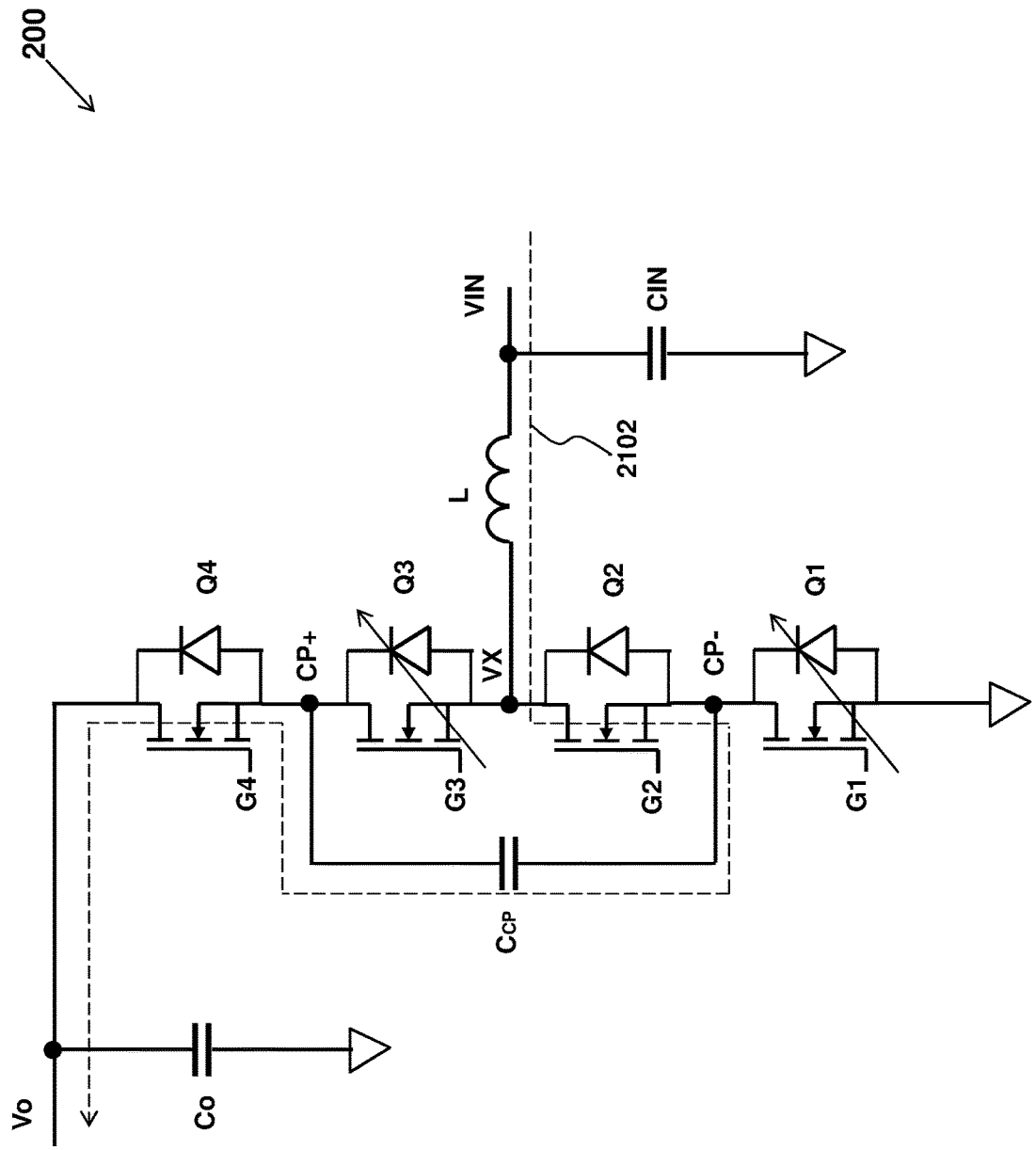
FIG. 21 illustrates the operating principle of the fourth phase of the high duty cycle mode of the multilevel converter shown in FIG. 12 in accordance with various embodiments of the present disclosure.

FIG. 21 illustrates the operating principle of the fourth phase of the high duty cycle mode of the multilevel converter shown in FIG. 12 in accordance with various embodiments of the present disclosure. During the fourth phase of the high duty cycle mode, the first switch Q1 and the third switch Q3 are turned off as indicated by the arrows placed on their symbols. Since switches Q2 and Q4 are turned on, a conductive path is established as indicated by the dashed line 2102 shown in FIG. 21. The conductive path is formed by the fourth switch Q4, the flying capacitor $C_{CP}$, the second switch Q2 and the inductor L.

During the fourth phase of the high duty cycle mode, the current discharges the flying capacitor $C_{CP}$ and the energy stored in the flying capacitor $C_{CP}$ decreases accordingly. In some embodiments, the current flowing through the inductor L ramps down and the energy stored in the inductor L decreases accordingly. In the fourth phase of the high duty cycle mode, the current slope S of the inductor L satisfies the following equation:

$$S=(VIN+Vc-Vo)/L \tag{22}$$

It should be noted that during the fourth phase of the high duty cycle mode, the output voltage Vo is greater than two times the input voltage VIN. More particularly, since the duty cycle is greater than 50%, the output voltage Vo is greater than two times the input voltage VIN. The voltage across the flying capacitor is approximately equal to one half of the output voltage Vo. As a result, the current slope S is of a negative value. The current flowing through the inductor L ramps down and the energy stored in the inductor Lo decreases accordingly.

During the fourth phase of the high duty cycle mode, the voltage variation across the flying capacitor $C_{CP}$ is the same as that during the second phase of the high duty cycle mode, and hence is not illustrated herein.

Figure 22:
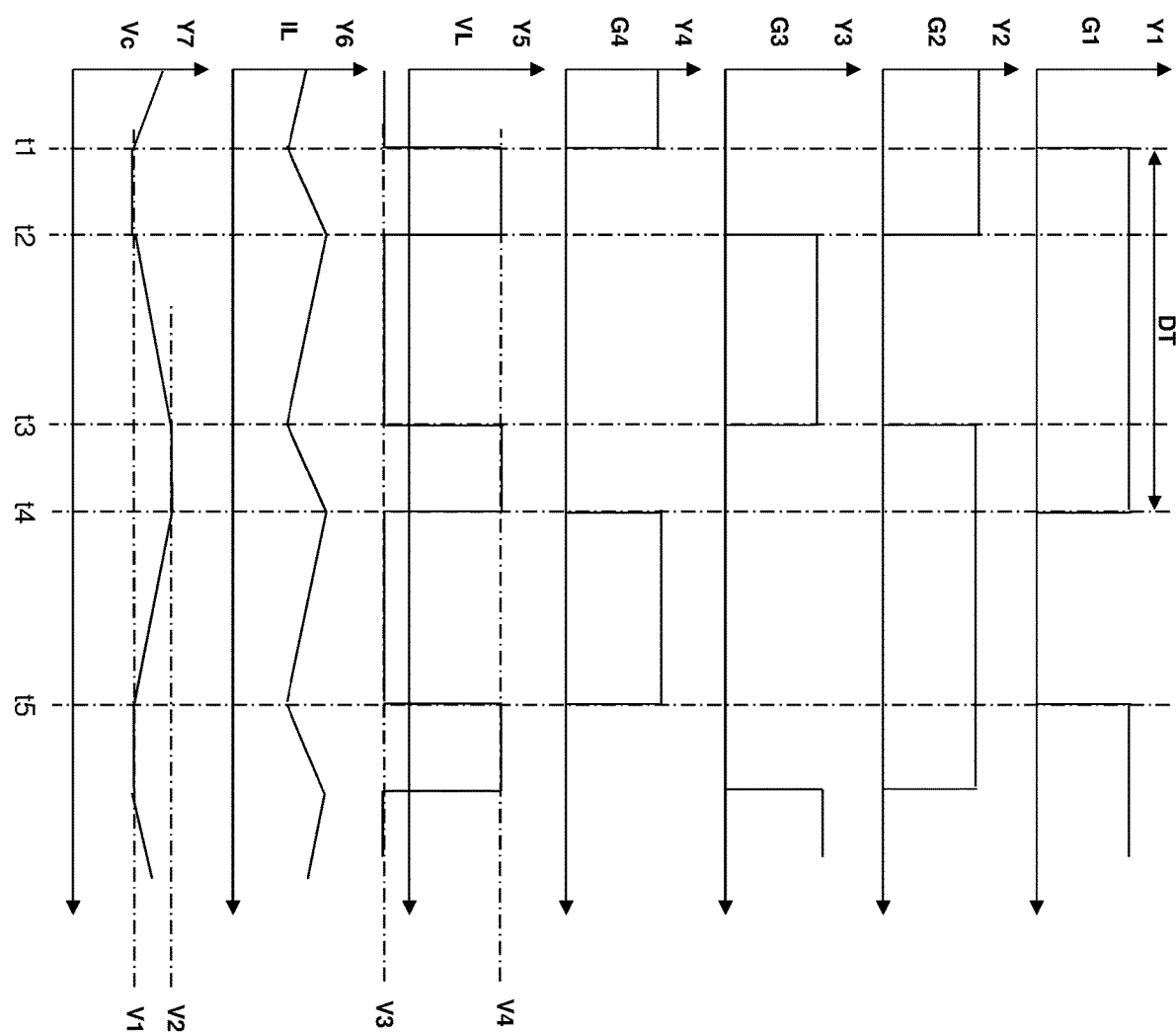
FIG. 22 illustrates a control timing diagram of the high duty cycle mode of the multilevel converter shown in FIG. 12 in accordance with various embodiments of the present disclosure.

FIG. 22 illustrates a control timing diagram of the high duty cycle mode of the multilevel converter shown in FIG. 12 in accordance with various embodiments of the present disclosure. The horizontal axis of FIG. 22 represents intervals of time. There are seven vertical axes. The first vertical axis Y1 represents the gate drive signal of the first switch Q1. The second vertical axis Y2 represents the gate drive signal of the second switch Q2. The third vertical axis Y3 represents the gate drive signal of the third switch Q3. The four vertical axis Y4 represents the gate drive signal of the fourth switch Q4. The fifth vertical axis Y5 represents the voltage applied to the inductor L. The sixth vertical axis Y6 represents the current flowing through the inductor L. The seventh vertical axis Y7 represents the voltage across the flying capacitor.

One switching cycle of the multilevel converter 200 can be divided into four phases as described above with respect to FIGS. 18-21. As shown in FIG. 22, the first phase is between time instants t1 and t2. The second phase is between time instants t2 and t3. The third phase is between time instants t3 and t4. The fourth phase is between time instants t4 and t5.

As shown in FIG. 22, the duty cycle of the first switch Q1 is equal to the duty cycle of the second switch Q2. The duty cycle of the first switch Q1 is in a range from 50% to 100%. In some embodiments, D is equal to the turn-on time of the gate drive signal applied to the first switch Q1 divided by the switching cycle of the multilevel converter 200. The gate drive signal of the fourth switch Q4 is complementary to the gate drive signal of the first switch Q1. The gate drive signal of the fourth switch Q3 is complementary to the gate drive signal of the first switch Q2. As shown in FIG. 22, there is a delay between a leading edge of the gate drive signal of the first switch Q1 and a leading edge of the gate drive signal of the second switch Q2. The delay is equal to one half of the switching cycle. Likewise, the delay between a leading edge of the gate drive signal of the fourth switch Q4 and a leading edge of the gate drive signal of the third switch Q3 is equal to one half of the switching cycle.

Referring back to FIG. 18, during the first phase (from t1 to t2), switches Q3 and Q4 are turned off. Switches Q1 and Q2 are turned on as shown in FIG. 18. As a result of turning on switches Q1 and Q2, a conductive path is established between Vo and ground. During the first phase, the flying capacitor is isolated by the turned-off switches Q3 and Q4. As shown in FIG. 22, the voltage across the flying capacitor is kept constant. From t1 to t2, the voltage across the flying capacitor is equal to a first voltage potential V1. During the first phase, a fourth voltage potential V4 is applied to the inductor L. The fourth voltage potential V4 is equal to the input voltage VIN.

Referring back to FIG. 19, during the second phase (from t2 to t3), switches Q2 and Q4 are turned off. Switches Q1 and Q3 are turned on. As a result of turning on switches Q3 and Q4, a conductive path is established between Vo and ground through the flying capacitor. During the second phase, the flying capacitor is charged and energy is stored in the flying capacitor accordingly. As shown in FIG. 22, during the second phase, the voltage across the flying capacitor is charged from the first voltage potential V1 to a second voltage potential V2. During the second phase, a third voltage potential V3 is applied to the inductor L. The third voltage potential V3 is equal to the difference between the input voltage VIN and one half of the output voltage Vo.

Referring back to FIG. 20, during the third phase (from t3 to t4), switches Q3 and Q4 are turned off. Switches Q1 and Q2 are turned on. As a result of turning on switches Q1 and Q2, a conductive path is established between Vo and ground. During the third phase, the flying capacitor is isolated by the turned-off switches Q3 and Q4. As shown in FIG. 22, the voltage across the flying capacitor is kept constant. From t3 to t4, the voltage across the flying capacitor is equal to the second voltage potential V2. During the third phase, the fourth voltage potential V4 is applied to the inductor L again.

Referring back to FIG. 21, during the fourth phase (from t4 to t5), switches Q1 and Q3 are turned off. Switches Q2 and Q4 are turned on. As a result of turning on switches Q2 and Q4, a conductive path is established between VIN and Vo through the flying capacitor. During the fourth phase, the current discharges the flying capacitor and the energy stored in the flying capacitor decreases accordingly. As shown in FIG. 22, during the fourth phase, the voltage across the flying capacitor is discharged from the second voltage potential V2 to the first voltage potential V1. As shown in FIG. 11, the voltage variation across the flying capacitor during the fourth phase (from t4 to t5) is equal to the voltage variation across the flying capacitor during the second phase (from t2 to t3). During the fourth phase, the third voltage potential V3 is applied to the inductor L again.

In the high duty cycle mode, the voltage variation (V2-V1) shown in FIG. 22 can be used to estimate the average current flowing through the inductor L. The average current is used as an average current control variable of a current control loop. The detailed implementation of the current control loop will be described below with respect to FIG. 23.

Figure 23:
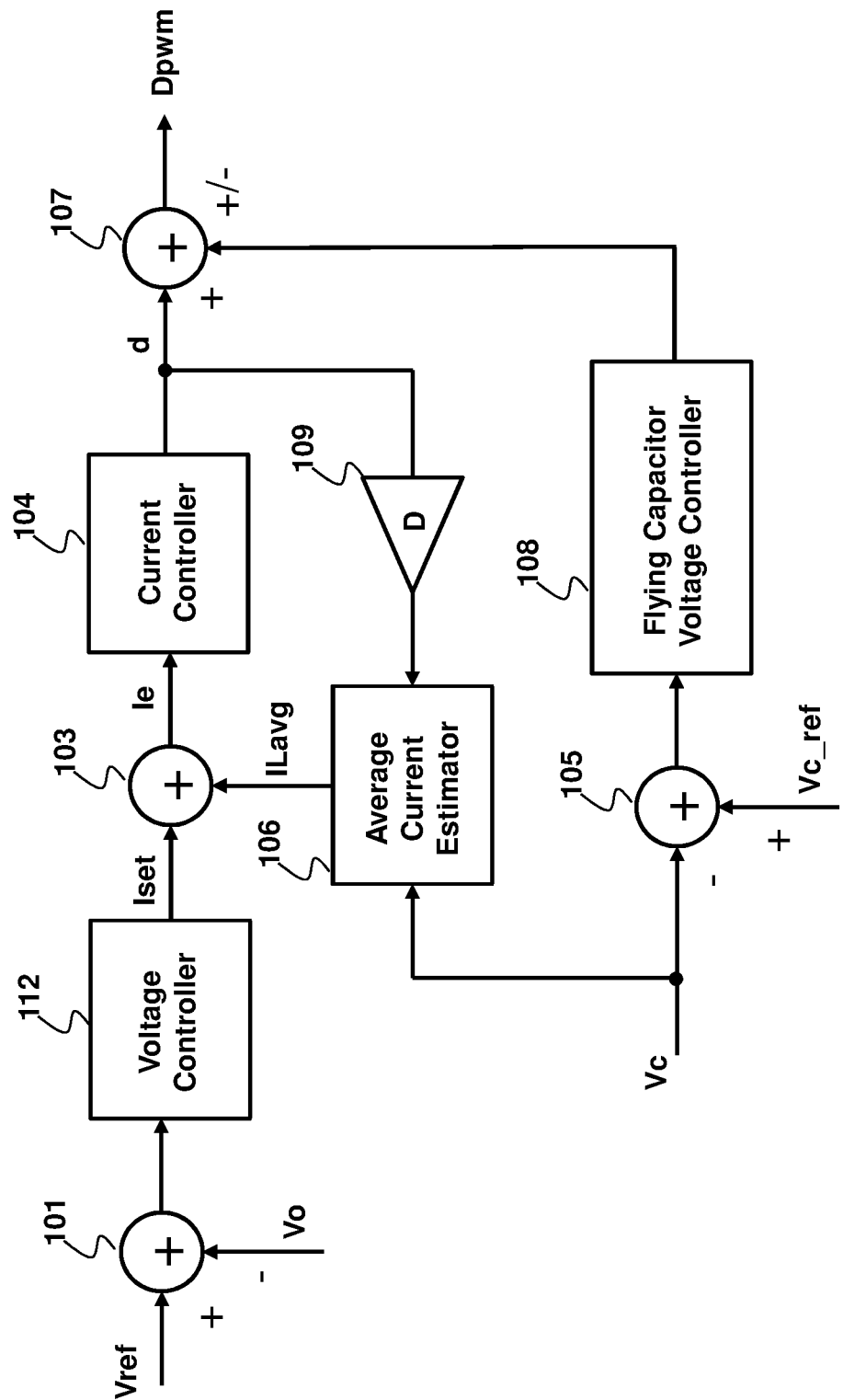
FIG. 23 illustrates a digital feedback control loop for controlling a multilevel converter in accordance with various embodiments of the present disclosure.

FIG. 23 illustrates a digital feedback control loop for controlling a multilevel converter in accordance with various embodiments of the present disclosure. The feedback control loop shown in FIG. 23 includes three loops, namely an inner current loop, an outer voltage loop and a flying capacitor voltage adjustment loop. The feedback control loop shown in FIG. 23 is applicable to the multilevel converters shown in FIGS. 1 and 12.

The outer voltage loop includes a first combiner 101 and a voltage controller 112. As shown in FIG. 23, the output voltage Vo is compared with a predetermined reference Vref at the first combiner 101. The voltage controller 112 is configured to receive the difference between the output voltage Vo and the predetermined reference Vref, and generate a current level (Iset) for setting the current flowing through the inductor of the multilevel converter.

The inner current loop comprises an operating mode determination apparatus 109, an average current estimator 106, a second combiner 103 and a current controller 104. The operating mode determination apparatus 109 is configured to receive the duty cycle signal d. Based on the received duty cycle signal d, the operating mode determination apparatus 109 determines the operating mode in which the multilevel converter operates. For example, when the duty cycle signal is between 0 and 50%, the multilevel converter operates in a low duty cycle mode. On the other hand, when the duty cycle signal is between 50% and 100%, the multilevel converter operates in a high duty cycle mode.

The average current estimator 106 is configured to receive both the duty cycle signal and the voltage across the flying capacitor (Vc). Based on different operating modes (low duty cycle mode or high duty cycle mode) and different system configurations (multilevel buck converter or multilevel boost converter), the average current estimator 106 is configured to generate an average current signal ILavg. The average current signal ILavg is proportional to the current flowing through the inductor of the multilevel converter.

In operation, during a switching cycle of the multilevel converter, a controller (e.g., controller 102 shown in FIGS. 1 and 12) may execute various steps including detecting a voltage variation across a flying capacitor of the multilevel converter, calculating a current flowing through an inductor of the multilevel power converter based on the voltage variation across the flying capacitor, and calculating, by the controller, a duty cycle of the multilevel power converter using the current flowing through the inductor as an average current control variable of a current control loop.

In a low duty cycle mode, the controller may execute various steps including configuring a first switch of the multilevel power converter to operate under a gate drive signal having the duty cycle calculated by the controller, detecting a first voltage across the flying capacitor after the flying capacitor has been discharged and enters into a first floating state, detecting a second voltage across the flying capacitor after the flying capacitor has been charged and enters into a second floating state, and calculating the voltage variation across the flying capacitor based on a voltage difference between the second voltage and the first voltage.

In a high duty cycle mode, the controller may execute various steps including configuring a first switch and a second switch of the multilevel power converter to operate under the duty cycle calculated by the controller, detecting a first voltage across the flying capacitor after the flying capacitor has been charged and enters into a second floating state, detecting a second voltage across the flying capacitor after the flying capacitor has been charged and enters into a second floating state, and calculating the voltage variation across the flying capacitor based on a voltage difference between the second voltage and the first voltage.

In operation, the controller may execute various steps including during a switching cycle of a multilevel power converter, detecting a first voltage across a flying capacitor of the multilevel power converter at a first time instant, detecting a second voltage across the flying capacitor at a second time instant, calculating, by a controller, a current flowing through an inductor of the multilevel power converter based on a voltage difference between the second voltage and the first voltage, and applying a current control loop to the multilevel power converter, wherein the current calculated by the controller functions as a current control variable for the current control loop. The first voltage is a minimum voltage across the flying capacitor during the switching cycle. The second voltage is a maximum voltage across the flying capacitor during the switching cycle.

In operation, when the multilevel converter is configured as a multilevel buck converter operating in a low duty cycle mode (FIGS. 2-6), the average current estimator 106 generates the following signal:

$$Iavg = (\Delta Vc \times fs \times Ccp)/D \quad (23)$$

where $\Delta Vc$ is the voltage variation across the flying capacitor during one switching cycle. In some embodiments, the voltage variation across the flying capacitor is a voltage difference between a maximum voltage across the flying capacitor and a minimum voltage across the flying capacitor during one switching cycle. In some embodiments, fs is the switching frequency of the multilevel converter, Ccp is the capacitance value of the flying capacitor, and D is the last calculated duty cycle of the multilevel converter.

As indicated by Equation (23), when the multilevel buck converter is configured to operate in a low duty cycle mode, the current flowing through the inductor calculated by a control circuit (e.g., the average current estimator 106) is proportional to the voltage variation across the capacitor (flying capacitor) during one switching cycle divided by the duty cycle of the multilevel buck converter.

In operation, when the multilevel converter is configured as a multilevel buck converter operating in a high duty cycle mode (FIGS. 7-11), the average current estimator 106 generates the following signal:

$$Iavg=(\Delta Vc \times fs \times Ccp)/(M \times D) \quad (24)$$

As indicated by Equation (24), when the multilevel buck converter is configured to operate in a high duty cycle mode, the current flowing through the inductor calculated by the control circuit is proportional to the voltage variation across the capacitor (flying capacitor) during one switching cycle divided by one minus the duty cycle of the multilevel buck converter.

In operation, when the multilevel converter is configured as a multilevel boost converter operating in a low duty cycle mode (FIGS. 13-17), the average current estimator 106 generates the following signal:

$$Iavg=(\Delta Vc \times fs \times Ccp)/(M \times D) \quad (25)$$

where M is equal to $1/(1-D)$.

As indicated by Equation (25), when the multilevel boost converter is configured to operate in the low duty cycle mode, the current flowing through the inductor calculated by the control circuit is proportional to the voltage variation across the capacitor (flying capacitor) during one switching cycle divided by the duty cycle of the multilevel boost converter.

In operation, when the multilevel converter is a multilevel boost converter operating in a high duty cycle mode (FIGS. 18-22), the average current estimator 106 generates the following signal:

$$Iavg=(\Delta Vc \times fs \times Ccp)/(M \times (1-D)) \quad (26)$$

As indicated by Equation (26), when the multilevel boost converter is configured to operate in the high duty cycle mode, the current flowing through the inductor calculated by the control circuit is proportional to the voltage variation across the capacitor (flying capacitor) during one switching cycle divided by one minus the duty cycle of the multilevel boost converter.

The output signal generated by the average current estimator 106 is an average current signal (ILavg). This average current signal is used as an average current control variable of a current loop (e.g., the inner current loop shown in FIG. 23). At the second combiner 103, the average current signal is compared with the current reference generated by the voltage controller 112. The difference between the average current signal and the current reference signal is a current error signal Ie, which is fed into the current controller 104 as shown in FIG. 23. Based on the current error signal, the current controller 104 generates a duty cycle for the multilevel converter.

The control loop shown in FIG. 23 further includes the flying capacitor voltage adjustment loop. As shown in FIG. 23, the flying capacitor voltage adjustment loop comprises a third combiner 105, a flying capacitor voltage controller 108 and a fourth combiner 107. The third combiner 105 is configured to receive the voltage across the flying capacitor and a predetermined flying capacitor reference voltage Vc_ref. The voltage across the flying capacitor is compared with the predetermined flying capacitor reference voltage at the third combiner 105. The difference between the voltage across the flying capacitor and the predetermined flying capacitor reference voltage is fed into the flying capacitor voltage controller 108. Based on the difference of these two voltages, the flying capacitor voltage controller 108 generates a duty cycle correction signal. At the fourth combiner 107, the duty cycle correction signal is used to modify the duty cycle generated by the current controller 104, thereby maintaining a balanced voltage across the flying capacitor. The fourth combiner 107 generates the final duty cycle Dpwm for the multilevel converter.

It should be noted that the control method shown in FIG. 23 is applicable to a variety of multilevel converters having one or more flying capacitors. Furthermore, the control method shown in FIG. 23 is applicable to different topologies such as buck converters, boost converters and the like. Moreover, the control method shown in FIG. 23 is applicable to various applications such as average current controllers for multilevel converters having an inductor current estimator, sliding mode controllers having a digital estimator for the peak current and the proposed average current estimator for the average inductor current, multilevel converter based PFC applications, predictive current mode controllers and the like. Additionally, the control method shown in FIG. 23 can be used to provide the current information for other functions such as weak overcurrent protection and the like.

It should be noted the control method shown in FIG. 23 can be implemented in both the analog domain and the digital domain. In some embodiments, it is easier to implement this control method in the digital domain due to the inherent arithmetic present inside the current estimator (e.g., the average current estimator 106 shown in FIG. 23). Furthermore, the function units shown in FIG. 23 can function as an average current estimator. This average current estimator can be embedded inside a digital current estimator. The digital current estimator is able to predict the current ripple of a power converter. The average current estimator can add the average current information with the current ripple predicted by the digital controller so as to obtain accurate information of the current flowing through the power converter. The accurate current information helps to improve the performance of the multilevel converter. For example, the accurate current information makes some overcurrent protection features possible.

One advantageous feature of the control method shown in FIG. 23 is the control method enables a current mode control loop without requiring an active inductor current sensor. This technique makes more complex control features possible.

Another advantageous feature of the control method shown in FIG. 23 is one analog-to-digital converter may be shared by both the inner current loop and the flying capacitor voltage adjustment loop. As shown in FIG. 23, both the inner current loop and the flying capacitor voltage adjustment loop require the information of the voltage across the flying capacitor. The voltage across the flying capacitor can be converted into a digital signal through an analog-to-digital converter. The digital signal may be shared by these two control loops. The detailed implementation of converting the voltage across the flying capacitor into a digital signal will be described below with respect to FIG. 24.

Figure 24:
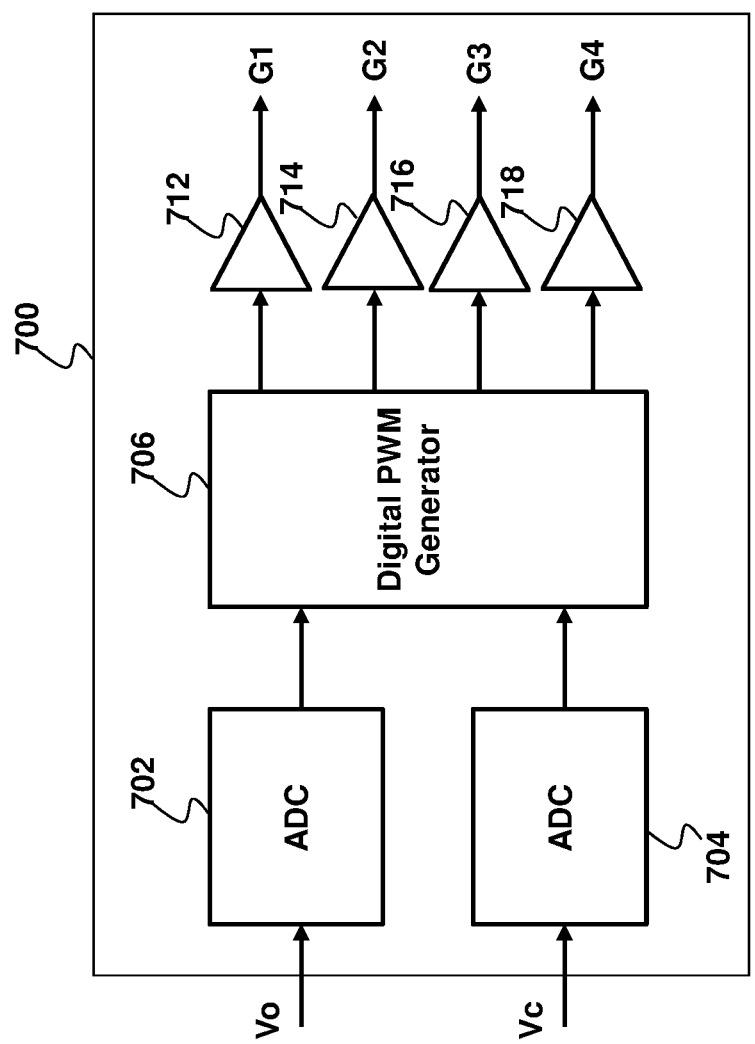
FIG. 24 illustrates a system diagram of a digital controller implementation for controlling the multilevel power converters shown in FIGS. 1 and 12 in accordance with various embodiments of the present disclosure.

FIG. 24 illustrates a system diagram of a digital controller implementation for controlling the multilevel power converters shown in FIGS. 1 and 12 in accordance with various embodiments of the present disclosure. As shown in FIG. 24, the controller 700 includes a first analog-to-digital converter 702, a second analog-to-digital converter 704, a digital PWM generator 706 and a plurality of drivers 712, 714, 716 and 718. As shown in FIG. 24, the first analog-to-digital converter 702 and the second analog-to-digital converter 704 are configured to receive the output voltage Vo and the voltage across the flying capacitor, respectively. The digital PWM generator 706 is configured to generate digital PWM signals. Through drivers 712-718, the digital PWM signals are converted into gate drive signals G1-G4 for driving the switches of the multilevel converters shown in FIGS. 1 and 12.

In operation, the first analog-to-digital converter 702 measures the output voltage Vo and converts the measured voltage into a first digital variable. It should be noted that depending difference applications and design needs, the first analog-to-digital converter 702 may not measure the output voltage Vo directly. For example, the first analog-to-digital converter 702 may measure the output voltage Vo through a suitable voltage scaling apparatus such as a resistor divider and the like.

In operation, the second analog-to-digital converter 704 measures and converts a voltage difference between the voltages sensed at the two terminals of the flying capacitor into a second digital variable. As shown in FIG. 24, the first digital variable from the first analog-to-digital converter 702 and the second digital variable from the second analog-to-digital converter 704 are fed into the digital PWM generator 706.

In some embodiments, the digital PWM generator 706 is implemented as a high speed processor such as a DSP. The DSP allows digital control implementation of the control method shown in FIG. 23. In particular, in each switching cycle, the DSP calculates a difference between a predetermined output voltage reference and the sensed output voltage. Based on the difference, the DSP generates a current reference signal. On the other hand, the DSP uses the sensed Vc to estimate the average current flowing through the inductor of the multilevel converter. Depending on different operating modes and topologies, the DSP may adjust the calculation method accordingly as shown in Equations (23-26) above. The average current is compared with the current reference signal to generate an error signal. According to the average current mode control mechanism, this error signal is used to generate the duty cycle of the multilevel converter. As described above with respect to FIGS. 1 and 12, the duty cycle of the multilevel converter is proportional to the turn-on time of the first switch. Based on the duty cycle, the gate drive signals G1-G4 can be generated accordingly.

FIG. 24 shows the control method in FIG. 23 can be fully implemented in the digital PWM generator 706. This is merely an example, which should not unduly limit the scope of the claims. One of ordinary skill in the art would recognize many variations, alternatives, and modifications. For example, the outer voltage loop may be implemented by analog circuits.

Figure 25:
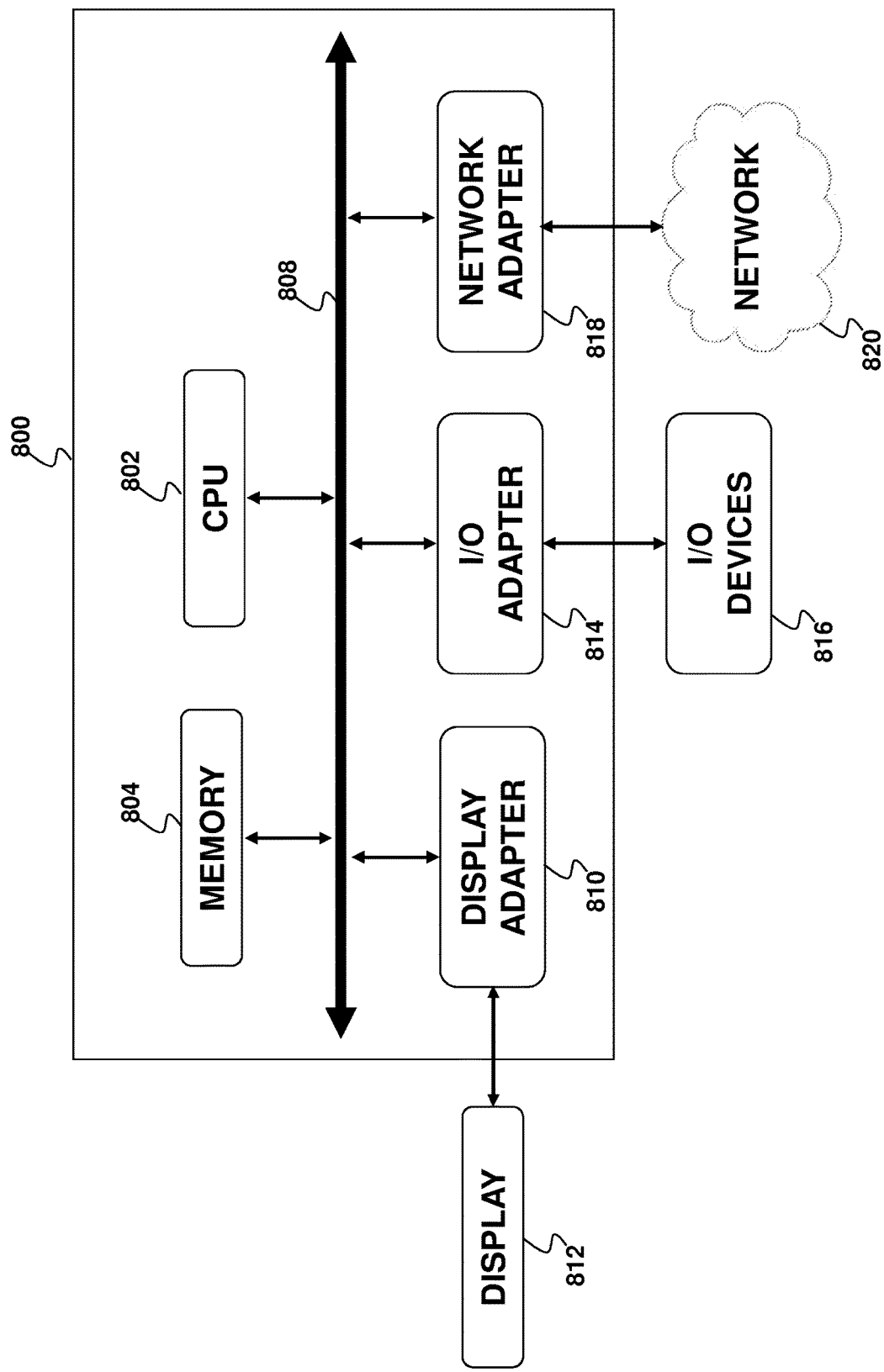
FIG. 25 illustrates a block diagram of a processing system in accordance with various embodiments of the present disclosure.

FIG. 25 illustrates a block diagram of a processing system in accordance with various embodiments of the present disclosure. The processing system 800 depicts a general-purpose platform and the general components and functionality that may be used to implement portions of the embodiment multilevel power converter and/or an external computer or processing device interfaced to the embodiment multilevel power converter. For example, processing system 800 may be used to implement a portion of controller 102 shown in FIGS. 1 and 12. In some embodiments, processing system 800 may be used to determine and evaluate embodiment operating parameters, as well as determine the duty cycle of the multilevel power converter based on the operating parameters.

Processing system 800 may include, for example, a central processing unit (CPU) 802, and memory 804 connected to a bus 808, and may be configured to perform the processes discussed above. The processing system 800 may further include, if desired or needed, a display adapter 810 to provide connectivity to a local display 812 and an input-output (I/O) Adapter 814 to provide an input/output interface for one or more input/output devices 816, such as a mouse, a keyboard, flash drive or the like.

The processing system 800 may also include a network interface 818, which may be implemented using a network adaptor configured to be coupled to a wired link, such as a network cable, USB interface, or the like, and/or a wireless/cellular link for communications with a network 820. The network interface 818 may also comprise a suitable receiver and transmitter for wireless communications. It should be noted that the processing system 800 may include other components. For example, the processing system 800 may include hardware components power supplies, cables, a motherboard, removable storage media, cases, and the like if implemented externally. These other components, although not shown, are considered part of the processing system 800. In some embodiments, processing system 800 may be implemented on a single monolithic semiconductor integrated circuit and/or on the same monolithic semiconductor integrated circuit as other disclosed system components.

Figure 26:
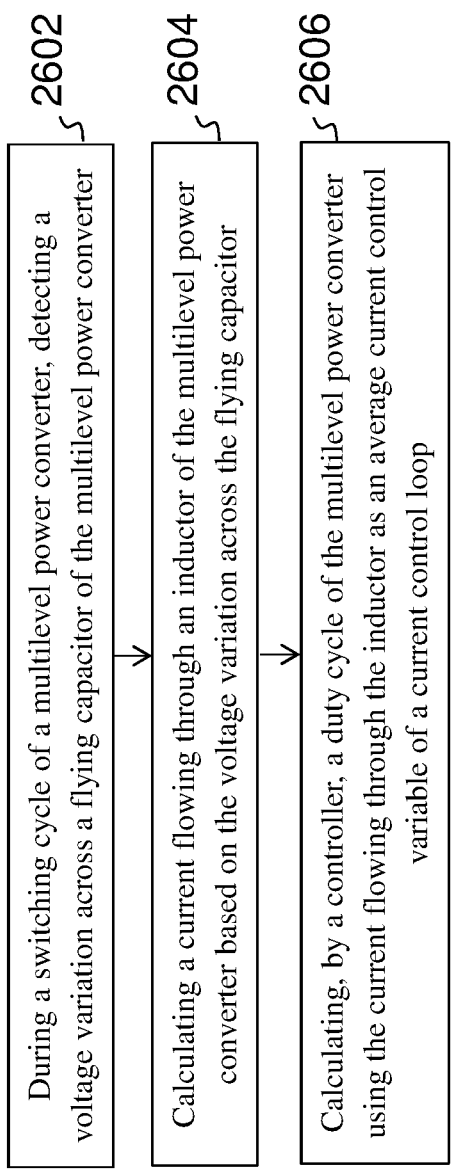
FIG. 26 illustrates a flow chart of a method for controlling the multilevel converters shown in FIGS. 1 and 12 in accordance with various embodiments of the present disclosure.

FIG. 26 illustrates a flow chart of a method for controlling the multilevel converters shown in FIGS. 1 and 12 in accordance with various embodiments of the present disclosure. This flowchart shown in FIG. 26 is merely an example, which should not unduly limit the scope of the claims. One of ordinary skill in the art would recognize many variations, alternatives, and modifications. For example, various steps illustrated in FIG. 26 may be added, removed, replaced, rearranged and repeated.

The multilevel converter may be a multilevel buck converter as shown in FIG. 1. Alternatively, the multilevel converter may be a multilevel boost converter as shown in FIG. 12. The average current mode control is applied to the multilevel converter. The average current mode control includes an outer loop and an inner loop. The outer loop is employed to regulate the output voltage of the multilevel converter. The inner loop is employed to regulate the current flowing through the inductor of the multilevel converter. A controller detects a voltage across the flying capacitor of the multilevel converter and calculates an estimated current value based on the voltage across the flying capacitor. The method below shows the steps of how to obtain the current flowing through the inductor of the multilevel converter. The method below is applicable to both the multilevel buck converter and the multilevel boost converter.

At step 2602, in a switching cycle of the multilevel converter, the voltage variation across the flying capacitor of multilevel converter is detected. For example, the voltage variation across the flying capacitor may be obtained by detecting a first voltage across the flying capacitor of the multilevel converter at a first time instant, detecting a second voltage across the flying capacitor at a second time instant, and calculating the voltage variation based on the voltage difference between the first voltage and the second voltage.

At step 2604, the current flowing through the inductor of the multilevel converter is calculated based on the voltage variation across the flying capacitor. Depending on different operating modes and topologies, the calculation method may be adjusted accordingly as shown in Equations (23-26) above.

At step 2606, a controller calculates the duty cycle of the multilevel converter using the current flowing through the inductor as an average current control variable of the current control loop.

Embodiments of the present invention are summarized here. Other embodiments can also be understood from the entirety of the specification and the claims filed herein.

Example 1. A controller including: a voltage sensing circuit configured to detect a voltage variation across a capacitor of a power converter, and a control circuit configured to calculate a current flowing through an inductor of the power converter based on the voltage variation across the capacitor of the power converter.

Example 2. The controller of example 1, where for calculating a gate drive signal applied to a switch of the power converter, the current flowing through the inductor calculated by the control circuit is used as an average current control variable of a current control loop.

Example 3. The controller of one of examples 1 or 2, where the voltage variation across the capacitor is a voltage difference between a maximum voltage across the capacitor and a minimum voltage across the capacitor during one switching cycle of the power converter.

Example 4. The controller of one of examples 1 to 3, where: the power converter is a multilevel buck converter including a first switch, a second switch, a third switch and a fourth switch connected in series between a power source and ground; the capacitor connected between a common node of the first switch and the second switch; and a common node of the third switch and the fourth switch, and the inductor connected between a common node of the second switch and the third switch, and a load.

Example 5. The controller of one of examples 1 to 4, where the multilevel buck converter is configured to operate in a low duty cycle mode, and where in the low duty cycle mode, the current flowing through the inductor calculated by the control circuit is proportional to the voltage variation across the capacitor during one switching cycle divided by a duty cycle of the multilevel buck converter.

Example 6. The controller of one of examples 1 to 4, where the multilevel buck converter is configured to operate in a high duty cycle mode, and where in the high duty cycle mode, the current flowing through the inductor calculated by the control circuit is proportional to the voltage variation across the capacitor during one switching cycle divided by one minus a duty cycle of the multilevel buck converter.

Example 7. The controller of one of examples 1 to 3, where the power converter is a multilevel boost converter including: a first switch, a second switch, a third switch and a fourth switch connected in series between a load and ground; the capacitor connected between a common node of the first switch and the second switch, and a common node of the third switch and the fourth switch; and the inductor connected between a common node of the second switch and the third switch, and a power source.

Example 8. The controller of one of examples 1 to 3 and 7, where the multilevel boost converter is configured to operate in a low duty cycle mode, and where in the low duty cycle mode, the current flowing through the inductor calculated by the control circuit is proportional to the voltage variation across the capacitor during one switching cycle divided by a duty cycle of the multilevel boost converter.

Example 9. The controller of one of examples 1 to 3 and 7, where the multilevel boost converter is configured to operate in a high duty cycle mode, and where in the high duty cycle mode, the current flowing through the inductor calculated by the control circuit is proportional to the voltage variation across the capacitor during one switching cycle divided by one minus a duty cycle of the multilevel boost converter.

Example 10. The controller of one of examples 1 to 9, where: a gate drive signal of the first switch is complementary to a gate drive signal of the fourth switch; and a gate drive signal of the second switch is complementary to a gate drive signal of the third switch.

Example 11. A method including: during a switching cycle of a multilevel power converter, detecting a voltage variation across a flying capacitor of the multilevel power converter; calculating a current flowing through an inductor of the multilevel power converter based on the voltage variation across the flying capacitor; and calculating, by a controller, a duty cycle of the multilevel power converter using the current flowing through the inductor as an average current control variable of a current control loop.

Example 12. The method of example 11, where the multilevel power converter is a multilevel buck converter including: a first switch, a second switch, a third switch and a fourth switch connected in series between an input voltage terminal and ground; the flying capacitor connected between a common node of the first switch and the second switch, and a common node of the third switch and the fourth switch; and the inductor connected between a common node of the second switch and the third switch, and an output voltage terminal.

Example 13. The method of example 11, where the multilevel power converter is a multilevel boost converter including: a first switch, a second switch, a third switch and a fourth switch connected in series between an output voltage terminal and ground; the flying capacitor connected between a common node of the first switch and the second switch, and a common node of the third switch and the fourth switch; and the inductor connected between a common node of the second switch and the third switch, and an input voltage terminal.

Example 14. The method of one of examples 11 to 13, further including: in a low duty cycle mode, configuring a first switch of the multilevel power converter to operate under a gate drive signal having the duty cycle calculated by the controller; detecting a first voltage across the flying capacitor after the flying capacitor has been discharged and enters into a first floating state; detecting a second voltage across the flying capacitor after the flying capacitor has been charged and enters into a second floating state; and calculating the voltage variation across the flying capacitor based on a voltage difference between the second voltage and the first voltage.

Example 15. The method of one of examples 11 to 13, further including: in a high duty cycle mode, configuring a first switch and a second switch of the multilevel power converter to operate under the duty cycle calculated by the controller; detecting a first voltage across the flying capacitor after the flying capacitor has been charged and enters into a second floating state; detecting a second voltage across the flying capacitor after the flying capacitor has been charged and enters into a second floating state; and calculating the voltage variation across the flying capacitor based on a voltage difference between the second voltage and the first voltage.

Example 16. The method of example 15, where in the high duty cycle mode, the duty cycle of the multilevel power converter is greater than 50%.

Example 17. A method including: during a switching cycle of a multilevel power converter, detecting a first voltage across a flying capacitor of the multilevel power converter at a first time instant; detecting a second voltage across the flying capacitor at a second time instant; calculating, by a controller, a current flowing through an inductor of the multilevel power converter based on a voltage difference between the second voltage and the first voltage; and applying a current control loop to the multilevel power converter, where the current calculated by the controller functions as a current control variable for the current control loop.

Example 18. The method of example 17, where: the first voltage is a minimum voltage across the flying capacitor during the switching cycle; and the second voltage is a maximum voltage across the flying capacitor during the switching cycle.

Example 19. The method of one of examples 17 or 18, where the multilevel power converter is a multilevel buck converter including: a first switch, a second switch, a third switch and a fourth switch connected in series between an input voltage terminal and ground; the flying capacitor connected between a common node of the first switch and the second switch, and a common node of the third switch and the fourth switch; and the inductor connected between a common node of the second switch and the third switch, and an output voltage terminal.

Example 20. The method of one of examples 17 or 18, where the multilevel power converter is a multilevel boost converter including: a first switch, a second switch, a third switch and a fourth switch connected in series between an output voltage terminal and ground; the flying capacitor connected between a common node of the first switch and the second switch, and a common node of the third switch and the fourth switch; and the inductor connected between a common node of the second switch and the third switch, and an input voltage terminal.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A controller comprising:
   a voltage sensing circuit configured to detect a voltage variation across a capacitor of a power converter; and
   a control circuit configured to calculate a current flowing through an inductor of the power converter based on the voltage variation across the capacitor of the power converter, wherein in a low duty cycle mode of the power converter, the current flowing through the inductor is proportional to the voltage variation across the capacitor divided by a duty cycle of the power converter, and in a high duty cycle mode of the power converter, the current flowing through the inductor is proportional to the voltage variation across the capacitor divided by one minus the duty cycle of the power converter.

2. The controller of claim 1, wherein:
   for calculating a gate drive signal applied to a switch of the power converter, the current flowing through the inductor calculated by the control circuit is used as an average current control variable of a current control loop.

3. The controller of claim 1, wherein:
   the voltage variation across the capacitor is a voltage difference between a maximum voltage across the capacitor and a minimum voltage across the capacitor during one switching cycle of the power converter.

4. The controller of claim 1, wherein the power converter is a multilevel buck converter comprising:
   a first switch, a second switch, a third switch and a fourth switch connected in series between a power source and ground;
   the capacitor connected between a common node of the first switch and the second switch, and a common node of the third switch and the fourth switch; and
   the inductor connected between a common node of the second switch and the third switch, and a load.

5. The controller of claim 4, wherein:
   the multilevel buck converter is configured to operate in a low duty cycle mode of the multilevel buck converter, and wherein in the low duty cycle mode of the multilevel buck converter, the current flowing through the inductor calculated by the control circuit is proportional to the voltage variation across the capacitor during one switching cycle divided by a duty cycle of the multilevel buck converter.

6. The controller of claim 4, wherein:
   the multilevel buck converter is configured to operate in a high duty cycle mode of the multilevel buck converter, and wherein in the high duty cycle mode of the multilevel buck converter, the current flowing through the inductor calculated by the control circuit is proportional to the voltage variation across the capacitor during one switching cycle divided by one minus a duty cycle of the multilevel buck converter.

7. The controller of claim 1, wherein the power converter is a multilevel boost converter comprising:
   a first switch, a second switch, a third switch and a fourth switch connected in series between a load and ground;
   the capacitor connected between a common node of the first switch and the second switch, and a common node of the third switch and the fourth switch; and
   the inductor connected between a common node of the second switch and the third switch, and a power source.

8. The controller of claim 7, wherein:
   the multilevel boost converter is configured to operate in a low duty cycle mode of the multilevel boost converter, and wherein in the low duty cycle mode of the multilevel boost converter, the current flowing through the inductor calculated by the control circuit is proportional to the voltage variation across the capacitor during one switching cycle divided by a duty cycle of the multilevel boost converter.

9. The controller of claim 7, wherein:
   the multilevel boost converter is configured to operate in a high duty cycle mode of the multilevel boost converter, and wherein in the high duty cycle mode of the multilevel boost converter, the current flowing through the inductor calculated by the control circuit is proportional to the voltage variation across the capacitor during one switching cycle divided by one minus a duty cycle of the multilevel boost converter.

10. The controller of claim 7, wherein:
a gate drive signal of the first switch is complementary to a gate drive signal of the fourth switch; and
a gate drive signal of the second switch is complementary to a gate drive signal of the third switch.

11. A method comprising:
during a switching cycle of a multilevel power converter, detecting a voltage variation across a flying capacitor of the multilevel power converter;
calculating a current flowing through an inductor of the multilevel power converter based on the voltage variation across the flying capacitor, wherein in a low duty cycle mode of the multilevel power converter, the current flowing through the inductor is proportional to the voltage variation across the flying capacitor divided by a duty cycle of the multilevel power converter, and in a high duty cycle mode of the multilevel power converter, the current flowing through the inductor is proportional to the voltage variation across the flying capacitor divided by one minus the duty cycle of the multilevel power converter; and
calculating, by a controller, the duty cycle of the multilevel power converter using the current flowing through the inductor as an average current control variable of a current control loop.

12. The method of claim 11, wherein the multilevel power converter is a multilevel buck converter comprising:
a first switch, a second switch, a third switch and a fourth switch connected in series between an input voltage terminal and ground;
the flying capacitor connected between a common node of the first switch and the second switch, and a common node of the third switch and the fourth switch; and
the inductor connected between a common node of the second switch and the third switch, and an output voltage terminal.

13. The method of claim 11, wherein the multilevel power converter is a multilevel boost converter comprising:
a first switch, a second switch, a third switch and a fourth switch connected in series between an output voltage terminal and ground;
the flying capacitor connected between a common node of the first switch and the second switch, and a common node of the third switch and the fourth switch; and
the inductor connected between a common node of the second switch and the third switch, and an input voltage terminal.

14. The method of claim 11, further comprising:
in the low duty cycle mode, configuring a first switch of the multilevel power converter to operate under a gate drive signal having the duty cycle calculated by the controller;
detecting a first voltage across the flying capacitor after the flying capacitor has been discharged and enters into a first floating state;
detecting a second voltage across the flying capacitor after the flying capacitor has been charged and enters into a second floating state; and
calculating the voltage variation across the flying capacitor based on a voltage difference between the second voltage and the first voltage.

15. The method of claim 11, further comprising:
in the high duty cycle mode, configuring a first switch and a second switch of the multilevel power converter to operate under the duty cycle calculated by the controller;
detecting a first voltage across the flying capacitor after the flying capacitor has been charged and enters into a second floating state;
detecting a second voltage across the flying capacitor after the flying capacitor has been charged and enters into a second floating state; and
calculating the voltage variation across the flying capacitor based on a voltage difference between the second voltage and the first voltage.

16. The method of claim 15, wherein:
in the high duty cycle mode, the duty cycle of the multilevel power converter is greater than 50%.

17. A method comprising:
during a switching cycle of a multilevel power converter, detecting a first voltage across a flying capacitor of the multilevel power converter at a first time instant;
detecting a second voltage across the flying capacitor at a second time instant;
calculating, by a controller, a current flowing through an inductor of the multilevel power converter based on a voltage difference between the second voltage and the first voltage, wherein in a low duty cycle mode of the multilevel power converter, the current flowing through the inductor is proportional to the voltage difference divided by a duty cycle of the multilevel power converter, and in a high duty cycle mode of the multilevel power converter, the current flowing through the inductor is proportional to the voltage difference divided by one minus the duty cycle of the multilevel power converter; and
applying a current control loop to the multilevel power converter, wherein the current calculated by the controller functions as a current control variable for the current control loop.

18. The method of claim 17, wherein:
the first voltage is a minimum voltage across the flying capacitor during the switching cycle; and
the second voltage is a maximum voltage across the flying capacitor during the switching cycle.

19. The method of claim 17, wherein the multilevel power converter is a multilevel buck converter comprising:
a first switch, a second switch, a third switch and a fourth switch connected in series between an input voltage terminal and ground;
the flying capacitor connected between a common node of the first switch and the second switch, and a common node of the third switch and the fourth switch; and
the inductor connected between a common node of the second switch and the third switch, and an output voltage terminal.

20. The method of claim 17, wherein the multilevel power converter is a multilevel boost converter comprising:
a first switch, a second switch, a third switch and a fourth switch connected in series between an output voltage terminal and ground;
the flying capacitor connected between a common node of the first switch and the second switch, and a common node of the third switch and the fourth switch; and
the inductor connected between a common node of the second switch and the third switch, and an input voltage terminal.

* * * * *